US012308571B2

(12) United States Patent
Mase et al.

(10) Patent No.: US 12,308,571 B2
(45) Date of Patent: May 20, 2025

(54) CONNECTOR WITH DETECTING MEMBER

(71) Applicant: SUMITOMO WIRING SYSTEMS, LTD., Mie (JP)

(72) Inventors: Tsuyoshi Mase, Mie (JP); Toshihiro Ito, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 357 days.

(21) Appl. No.: 17/790,280

(22) PCT Filed: Dec. 23, 2020

(86) PCT No.: PCT/JP2020/048072
§ 371 (c)(1),
(2) Date: Jun. 30, 2022

(87) PCT Pub. No.: WO2021/145173
PCT Pub. Date: Jul. 22, 2021

(65) Prior Publication Data

US 2023/0029881 A1 Feb. 2, 2023

(30) Foreign Application Priority Data

Jan. 13, 2020 (JP) ................................ 2020-003308

(51) Int. Cl.
*H01R 13/639* (2006.01)

(52) U.S. Cl.
CPC ................................. *H01R 13/639* (2013.01)

(58) Field of Classification Search
CPC .......................... H01R 13/639; H01R 13/6295
USPC .................................................. 439/352, 157
See application file for complete search history.

(56) References Cited

U.S. PATENT DOCUMENTS 5,928,010 A * 7/1999 Katsuma .......... H01R 13/62933 439/157
6,328,582 B1 * 12/2001 Fukamachi .......... H01R 13/642 439/157
2003/0082940 A1 * 5/2003 Yamashita ....... H01R 13/62977 439/157

(Continued)

FOREIGN PATENT DOCUMENTS

DE 102017002304 A1 * 10/2017 ........... H01R 13/627
JP 2003086301 A * 3/2003

(Continued)

OTHER PUBLICATIONS

International Search Report issued on Mar. 23, 2021 for WO 2021/145173 A1 (4 pages).

*Primary Examiner* — Marcus E Harcum
(74) *Attorney, Agent, or Firm* — Venjuris, P.C.

(57) ABSTRACT

A lever is rotatable along an outer surface of a connector body. A detecting member is movable to a detection position along the outer surface of the connector body. The connector body includes, on an outer surface side, a movement restricting portion arcuately extending in a rotating direction of the lever and capable of abutting on a surface of the detecting member on the detection position side before the connector body and a mating housing are properly connected. The connector body includes, on the outer surface side, a pressing portion capable of abutting on a surface of the detecting member opposite to a surface of the detecting member facing the outer surface of the connector body.

4 Claims, 19 Drawing Sheets

(56) References Cited

U.S. PATENT DOCUMENTS

| | | | | |
|---|---|---|---|---|
| 2003/0190836 | A1 | 10/2003 | Yamashita | |
| 2006/0281351 | A1 * | 12/2006 | Yamaoka | H01R 13/62938 439/157 |
| 2007/0072482 | A1 * | 3/2007 | Fujii | H01R 13/62938 439/489 |
| 2007/0199369 | A1 * | 8/2007 | Tsuji | H01R 13/62927 73/40.7 |
| 2010/0048053 | A1 * | 2/2010 | Tonosaki | H01R 13/62938 439/299 |
| 2016/0204538 | A1 | 7/2016 | Matsuura | |
| 2017/0365950 | A1 * | 12/2017 | Matsuura | H01R 13/64 |
| 2019/0044278 | A1 * | 2/2019 | Amemiya | H01R 13/641 |

FOREIGN PATENT DOCUMENTS

| | | | | | |
|---|---|---|---|---|---|
| JP | 2005-085670 | A | | 3/2005 | |
| JP | 2007-103200 | A | | 4/2007 | |
| JP | 2009117045 | A | * | 5/2009 | |
| JP | 2014-075345 | A | | 4/2014 | |
| JP | 2015-118830 | A | | 6/2015 | |
| JP | 5772729 | B2 | * | 9/2015 | H01R 13/62955 |
| JP | 2020-027720 | A | | 2/2020 | |

* cited by examiner

CONNECTOR WITH DETECTING MEMBER

CROSS REFERENCE TO RELATED APPLICATIONS

This application is a national phase of PCT application No. PCT/JP2020/048072, filed on 23 Dec. 2020, which claims priority from Japanese patent application No. 2020-003308, filed on 13 Jan. 2020, all of which are incorporated herein by reference.

TECHNICAL FIELD

The present disclosure relates to a connector.

BACKGROUND

A connector disclosed in Patent Document 1 includes a connector body, a lever rotatably supported on the connector body and a detecting member held in the lever. The connector body is composed of a connector housing and a wire cover. The connector body includes arcuate portions extending in a rotating direction of the lever on a pair of side surfaces of the wire cover. The detecting member is arranged movably from a standby position to a detection position with respect to the lever. In a rotation process of the lever, the detecting member is displaced while abutting on the arcuate portions, and is held at the standby position. When the rotation of the lever is completed, the detecting member reaches end positions of the arcuate portions and faces lock receiving portions recessed at the end positions. Thereafter, the detecting member is pushed into the lock receiving portions and reaches the detection position. The detecting member reaches the detection position in this way, whereby it can be detected that the connector body has been properly connected to a mating housing.

PRIOR ART DOCUMENT

Patent Document

Patent Document 1: JP 2003-257546 A

SUMMARY OF THE INVENTION

Problems to be Solved

The above arcuate portions merely abut on the detecting member in a thickness range of the detecting member. Thus, for example, if there is a large assembling error between the lever and the connector body or the detecting member is warped and deformed, the arcuate portions cannot receive the detecting member and the detecting member may drop to the detection position side.

Accordingly, the present disclosure aims to provide a connector configured to prevent an inadvertent movement of a detecting member toward a detection position.

Means to Solve the Problem

The present disclosure is directed to a connector with a connector body, a lever supported on the connector body, the lever promoting connection of the connector body and a mating housing, and a detecting member supported in the lever, the detecting member being movable to a detection position when the connector body and the mating connector body are properly connected, wherein the lever is rotatable along an outer surface of the connector body, the detecting member is movable to the detection position along the outer surface of the connector body, the connector body includes, on an outer surface side, a movement restricting portion arcuately extending in a rotating direction of the lever, the movement restricting portion being capable of abutting on a surface of the detecting member on the detection position side before the connector body and the mating housing are properly connected, and the connector body includes, on the outer surface side, a pressing portion capable of abutting on a surface of the detecting member opposite to a surface of the detecting member facing the outer surface of the connector body.

Effect of the Invention

According to the present disclosure, it is possible to provide a connector configured to prevent an inadvertent movement of a detecting member.

DETAILED DESCRIPTION TO EXECUTE THE INVENTION

Description of Embodiments of Present Disclosure

Figure 1:
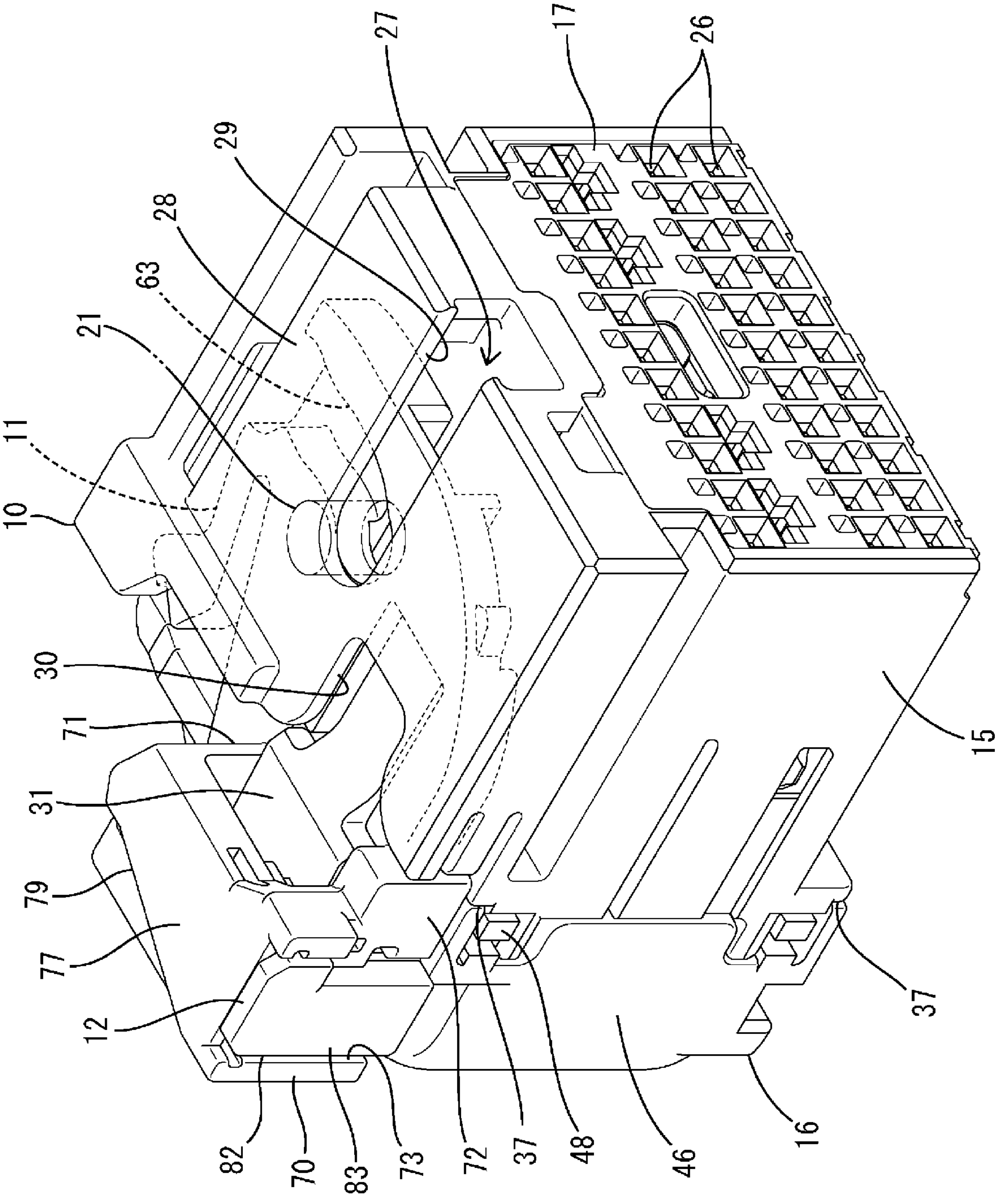
FIG. 1 is a perspective view of a connector according to an embodiment.

First, embodiments of the present disclosure are listed and described.

(1) The connector of the present disclosure is provided with a connector body, a lever supported on the connector body, the lever promoting connection of the connector body and a mating housing, and a detecting member supported in the lever, the detecting member being movable to a detection position when the connector body and the mating connector body are properly connected, wherein the lever is rotatable along an outer surface of the connector body, the detecting member is movable to the detection position along the outer surface of the connector body, the connector body includes, on an outer surface side, a movement restricting portion arcuately extending in a rotating direction of the lever, the movement restricting portion being capable of abutting on a surface of the detecting member on the detection position side before the connector body and the mating housing are properly connected, and the connector body includes, on the outer surface side, a pressing portion capable of abutting on a surface of the detecting member opposite to a surface of the detecting member facing the outer surface of the connector body. According to this configuration, before the connector body and the mating housing are properly connected, the detecting member abuts on the movement restricting portion, whereby a movement of the detecting member toward the detection position can be prevented.

Further, outward separation of the detecting member from the outer surface of the detecting member can be prevented by the abutment of the detecting member on the pressing portion. As a result, a state where the detecting member abuts on the movement restricting portion is ensured and an inadvertent movement of the detecting member toward the detection position can be prevented.

(2) Preferably, the connector body includes a rib on the outer surface of the connector body, and the movement restricting portion and the pressing portion are provided on a projecting end part of the rib. According to this configuration, the movement restricting portion and the pressing portion can be integrally and compactly formed in a projection range of the rib.

(3) The outer surfaces of the connector body may be arranged in a pair, and the lever may be in the form of a flat plate rotatable along either one of the pair of outer surfaces of the connector body. If the lever is gate-shaped and arranged to straddle the connector body, there is a little concern for the outward separation of the lever from the outer surface of the connector body. However, the lever in the form of a flat plate as described above is easily separated outward from the outer surface of the connector body. Thus, the detecting member may be easily detached from the movement restricting portion. In that respect, according to the above configuration, the outward separation of the detecting member from the outer surface of the connector body can be prevented by the pressing portion. Thus, advantages of this configuration can be suitably enjoyed in the case of the connector including the lever in the form of a flat plate as described above.

(4) A deflectable and deformable lock arm may be provided which holds the connector body and the mating housing in a connected state, the connector body may have a movement path to the detection position for the detecting member on the outer surface of the connector body, the movement path may be facing an end part of the movement restricting portion in an extending direction, and the detecting member may include a detecting piece to be arranged in a deflection space for the lock arm at the detection position. According to this configuration, after the connector body and the mating housing are properly connected, the detecting member can reach the detection position through the movement path and the detecting piece can enter the deflection space for the lock arm. In this way, the deflection of the lock arm is restricted and the connector body and the mating housing are satisfactorily held in the connected state. On the other hand, a movement of the detecting member to the detection position is restricted by the interference of the detecting piece with the deflected and deformed lock arm. In this way, it can be known that a deflected state of the lock arm is not released, i.e. it can be detected that the connector body and the mating housing are not in a properly connected state.

Further, before the connector body and the mating housing are connected, the detecting member abuts on the movement restricting portion and a movement of the detecting member to the detection position is restricted.

Therefore, according to the above configuration, an inadvertent movement of the detecting member toward the detection position can be satisfactorily prevented.

Details of Embodiment of Present Disclosure

A specific example of a connector of the present disclosure is described below with reference to the drawings. Note that the present invention is not limited to these illustrations and is intended to be represented by claims and include all changes in the scope of claims and in the meaning and scope of equivalents.

Figure 2:
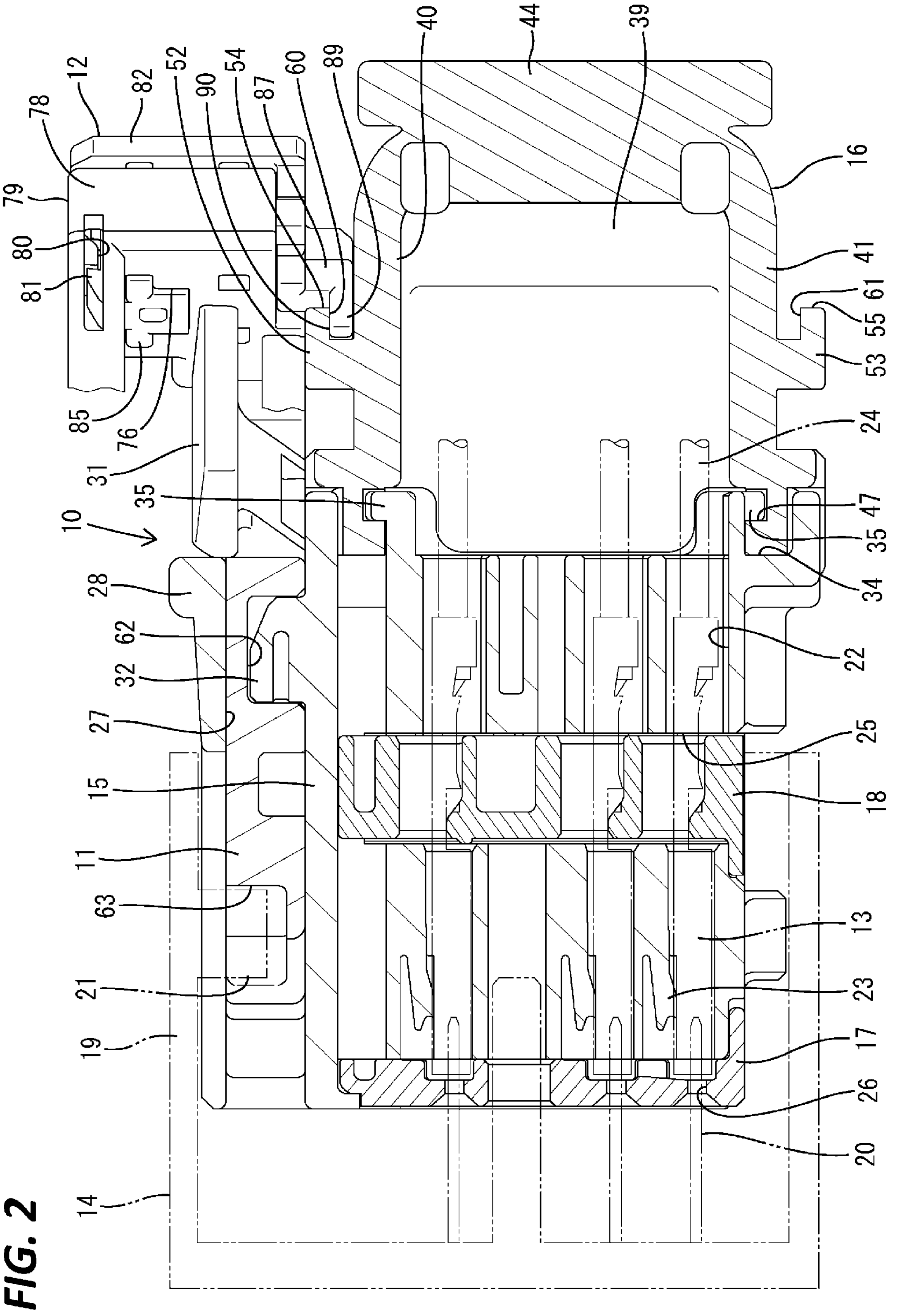
FIG. 2 is a side view in section of the connector in which a lever is at a partial locking position.

A connector according to an embodiment includes a connector body 10, a lever 11, a detecting member 12 and terminal fittings 13 as shown in FIG. 2. The connector body 10 is connectable to a mating housing 14. The connector body 10 includes a housing 15, a cover 16, a front holder 17 and a retainer 18. The connector body 10 is a part for accommodating and holding the terminal fittings 13 and wires 24 connected to the terminal fittings 13. Note that, in the following description, surface sides facing each other when the connection of the connector body 10 and the mating housing 14 is started are referred to as front sides concerning a front-rear direction. A vertical direction is based on a vertical direction of each of FIGS. 1 to 3. Directions specified in this specification may not necessarily coincide with actual directions.

<Mating Housing>

The mating housing 14 is made of synthetic resin and includes, as shown in FIG. 2, a tubular receptacle 19. A plurality of tab-like male terminal fittings 20 are arranged to project into the receptacle 19. A cylindrical cam follower 21 projects on the inner surface of the upper wall of the receptacle 19. The mating housing 14 is fixed to an unillustrated circuit board. Rear parts of the male terminal fittings 20 are connected to conductive parts of the circuit board outside the receptacle 19.

<Housing, Terminal Fittings, Retainer, Front Holder>

Figure 3:
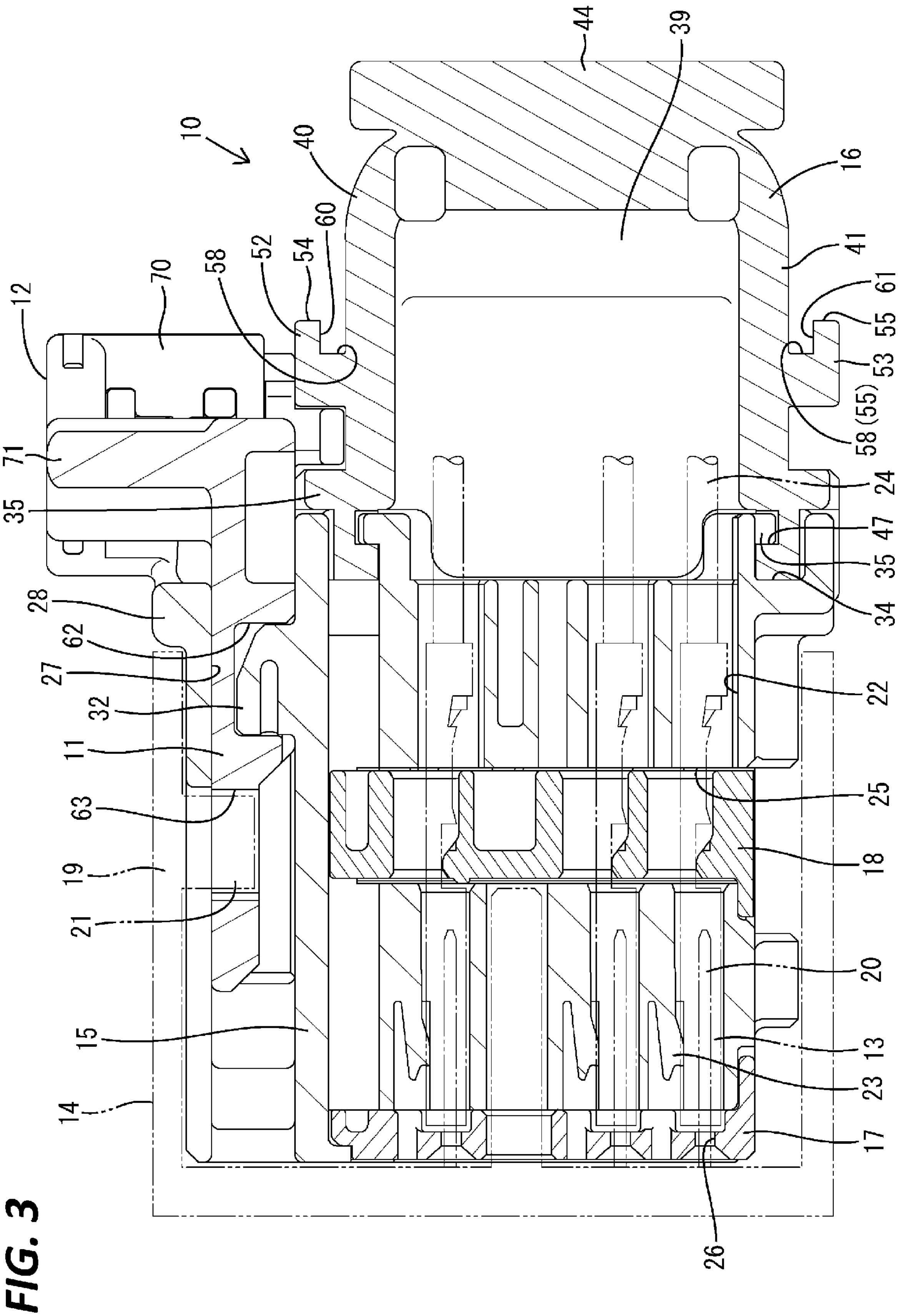
FIG. 3 is a side view in section of the connector in which the lever is at a full locking position.

The housing 15 is made of synthetic resin, in the form of a rectangular block and, as shown in FIGS. 2 and 3, fit into the receptacle 19. The housing 15 includes a plurality of cavities 22 inside. Each cavity 22 is formed to penetrate through the housing 15 in the front-rear direction. The housing 15 includes a locking lance 23 projecting forward at the inner wall of each cavity 22.

The terminal fitting 13 is inserted into each cavity 22 of the housing 15 from behind. The terminal fitting 13 is primarily locked by the locking lance 23 in the cavity 22.

The terminal fitting 13 is a female terminal fitting and formed, such as by bending an electrically conductive metal plate. When the connector body 10 and the mating housing 14 are connected, front parts of the male terminal fittings 20 are inserted and connected to box-shaped parts on front sides of the terminal fittings 13. The terminal fitting 13 is electrically and mechanically connected to an end part of the wire 24.

The housing 15 includes a retainer mounting hole 25 extending in the vertical direction and open in a lower surface. The retainer mounting hole 25 communicates with each cavity 22. The retainer 18 is inserted into the retainer mounting hole 25 of the housing 15 from below. The terminal fittings 13 are secondarily locked by the retainer 18 and reliably retained in the housing 15.

The front holder 17 is attached to the housing 15. The front holder 17 has a front wall part for covering the front surface of the housing 15. The front wall part of the front holder 17 includes a plurality of male terminal insertion holes 26 at positions communicating with the respective cavities 22. The male terminal fitting 20 is inserted through the male terminal insertion hole 26 and connected to the terminal fitting 13.

Figure 4:
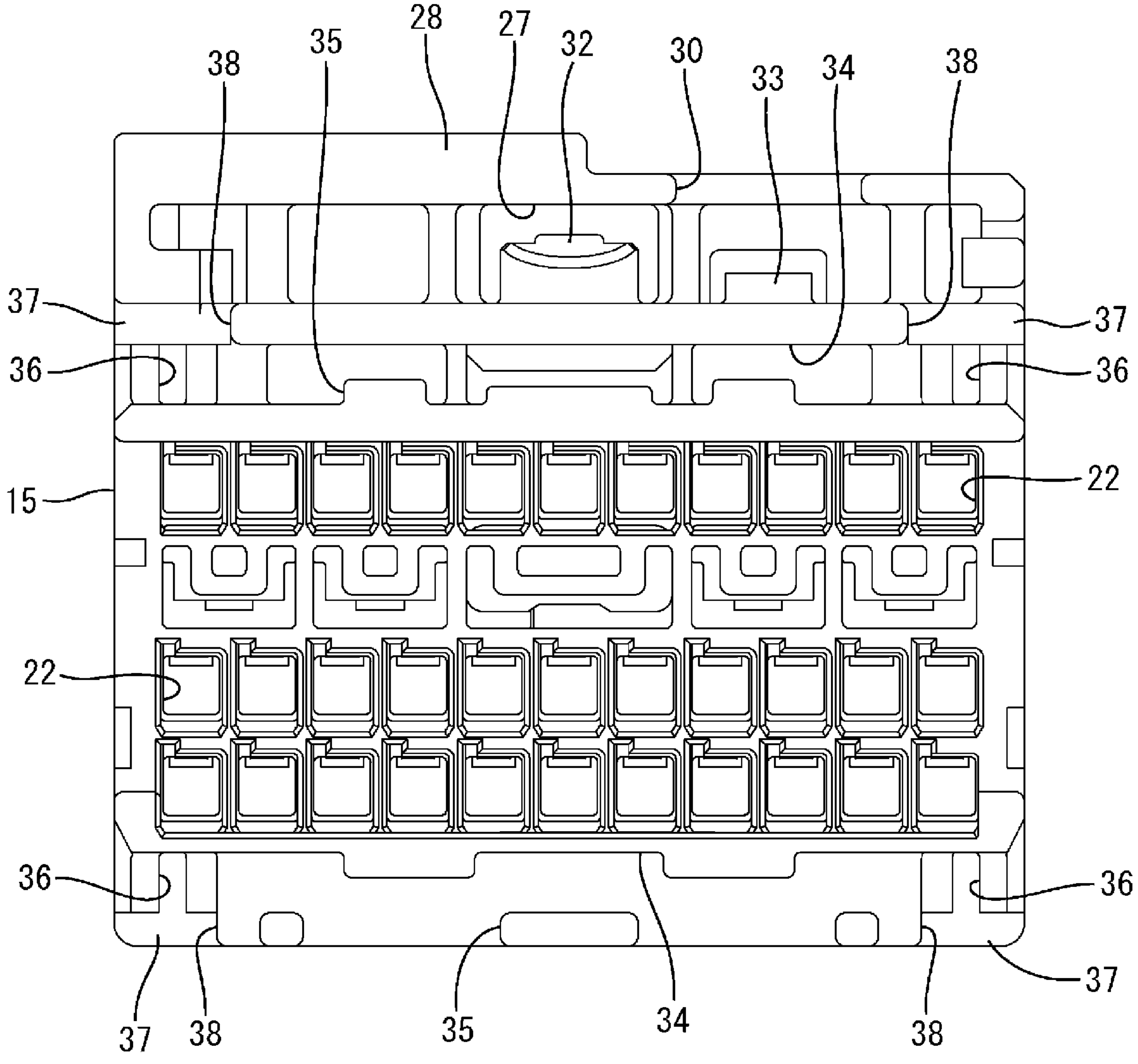
FIG. 4 is a back view of a housing.

The housing 15 includes a lever accommodation chamber 27 in an upper end part higher than a formation region of the respective cavities 22 and an attachment region of the front holder 17. As shown in FIG. 4, the lever accommodation chamber 27 is in the form of a flat pocket extending in a width direction and is open in the rear surface of the housing 15.

The housing 15 has an upper wall portion 28 defining the upper surface of the lever accommodation chamber 27. As shown in FIG. 1, the upper wall portion 28 includes a cam follower insertion groove 29 extending in the front-rear direction and open in the front surface of the housing 15 in a widthwise central part. The cam follower 21 of the mating housing 14 is inserted into the cam follower insertion groove 29. Further, the upper wall portion 28 includes an arm escaping portion 30 recessed in the rear end edge on one widthwise side (left side of FIG. 1). A lock arm 31 to be described later enters the arm escaping portion 30 to escape (see FIG. 14).

As shown in FIG. 4, the housing 15 is provided with a cylindrical shaft portion 32 projecting in a widthwise central part of the lower surface of the lever accommodation chamber 27. The shaft portion 32 rotatably supports the lever 11. Further, the housing 15 is provided with a claw-like lock portion 33 projecting on one widthwise side of the lower surface of the lever accommodation chamber 27. The lock portion 33 has a smaller projecting dimension than the shaft portion 32. The lock portion 33 is arranged to face the arm escaping portion 30 at a position near the rear end of the lever accommodation chamber 27.

As shown in FIG. 4, upper and lower rail grooves 34 extending along the width direction are open in the rear surface of the housing 15. The upper rail groove 34 is arranged below the lever accommodation chamber 27. The lower rail groove 34 is arranged in a lower end part of the housing 15. The formation region of the respective cavities 22 is located between the both rail grooves 34. The both rail grooves 34 are in the form of slits extending over the entire width of the housing 15. The both rail grooves 34 include meshing portions 35 at a plurality of intermediate positions in an extending direction. As shown in FIG. 2, the meshing portion 35 has a L-shaped cross-section when viewed from the extending direction of the rail groove 34.

Further, as shown in FIG. 4, the both rail grooves 34 include lock receiving portions 36 in the form of linear grooves extending along the vertical direction on the back surfaces of both end sides in the width direction (extending direction). The cover 16 is mounted on the housing 15 by being slid along the both rail grooves 34, a sliding movement thereof is restricted by the lock receiving portions 36 and the separation thereof from the rail grooves 34 is suppressed by the meshing portions 35.

As shown in FIGS. 1 and 4, the housing 15 includes a pair of upper cut portions 37 and a pair of lower cut portions 37 at positions near four corners of the rear surface. The respective cut portions 37 are arranged at positions near the respective lock receiving portions 36 of the both rail grooves 34. The upper cut portions 37 are arranged to communicate with the lever accommodation chamber 27. Each cut portion 37 is open rearward and laterally and includes a stopper portion 38 extending along the vertical direction on an inner side surface. The stopper portion 38 stops a sliding movement of the cover 16.

<Cover>

Figure 5:
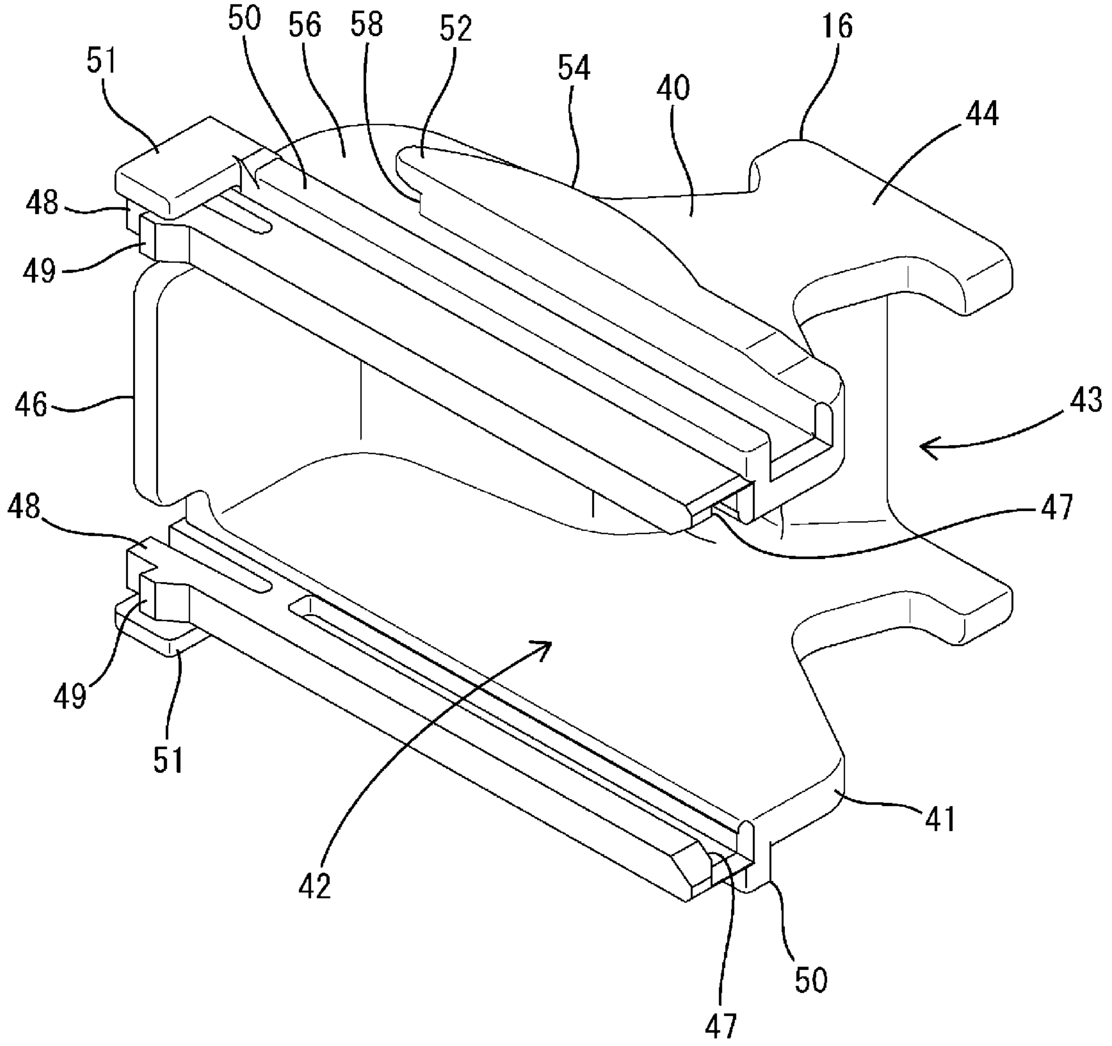
FIG. 5 is a perspective view of a cover having one facing surface arranged on an upper surface side.
Figure 6:
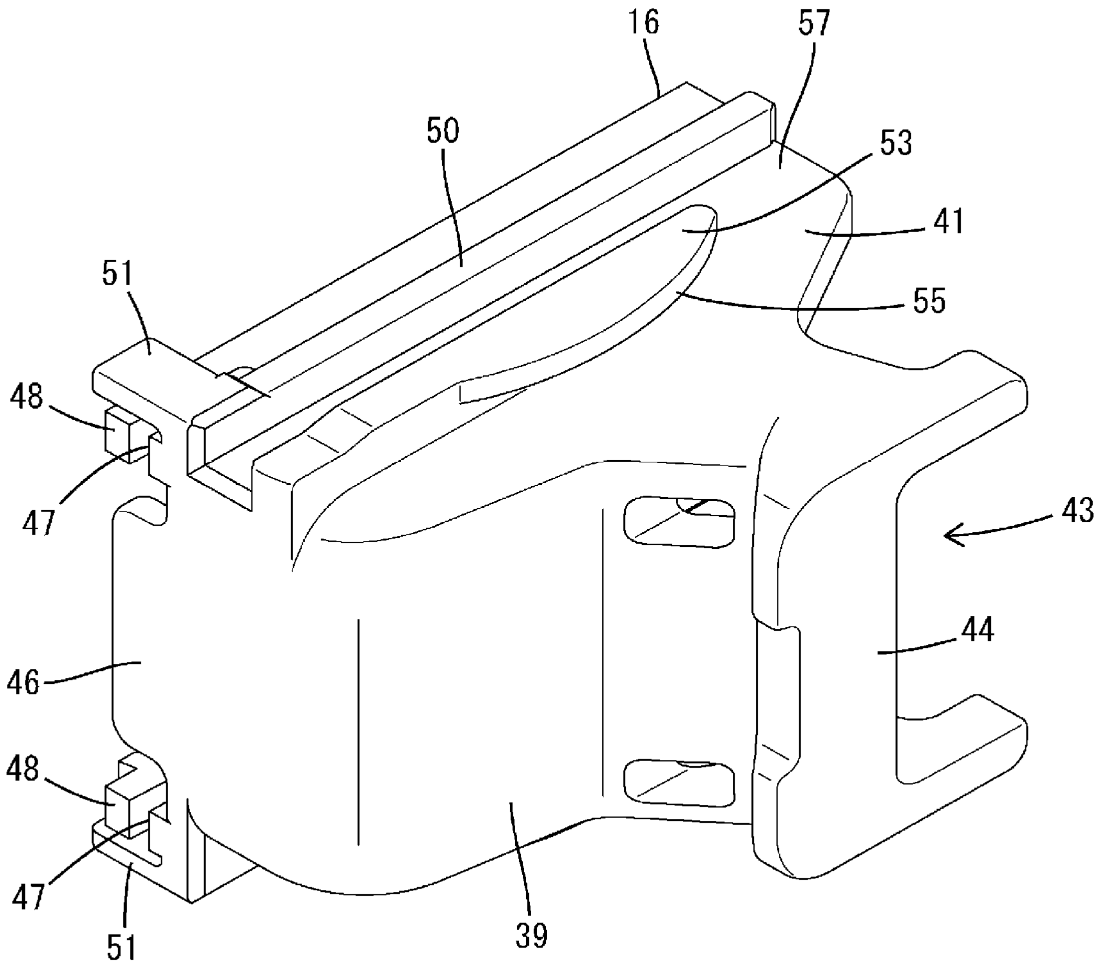
FIG. 6 is a perspective view of the cover having another facing surface arranged on the upper surface side.

The cover 16 is made of synthetic resin and cap-shaped as a whole as shown in FIGS. 5 and 6. As shown in FIG. 2, the cover 16 is mounted on the housing 15 and surrounds the plurality of wires 24 pulled out from the rear surface of the housing 15. The cover 16 has a back wall 39 arranged to face the rear surface of the housing 15 while being mounted on the housing 15, and a pair of facing walls 40, 41 projecting forward from upper and lower end parts of the back wall 39. The both facing walls 40, 41 are arranged to face in parallel to each other.

The cover 16 has a space part for accommodating the wires 14 inside and is open forward and laterally (obliquely laterally). As shown in FIG. 5, a front opening of the cover 15 serves as a wire draw-in opening 42 through which the wires 24 are drawn into the space part. The upper and lower ends of the wire draw-in opening 42 are defined by the front ends of the both facing walls 40, 41. A lateral opening of the cover 16 serves as a wire draw-out opening 43 through which the wires 24 are drawn out to outside. The wire draw-out opening 43 is defined by a draw-out tube 44 in a rear part of the cover 16.

Figure 18:
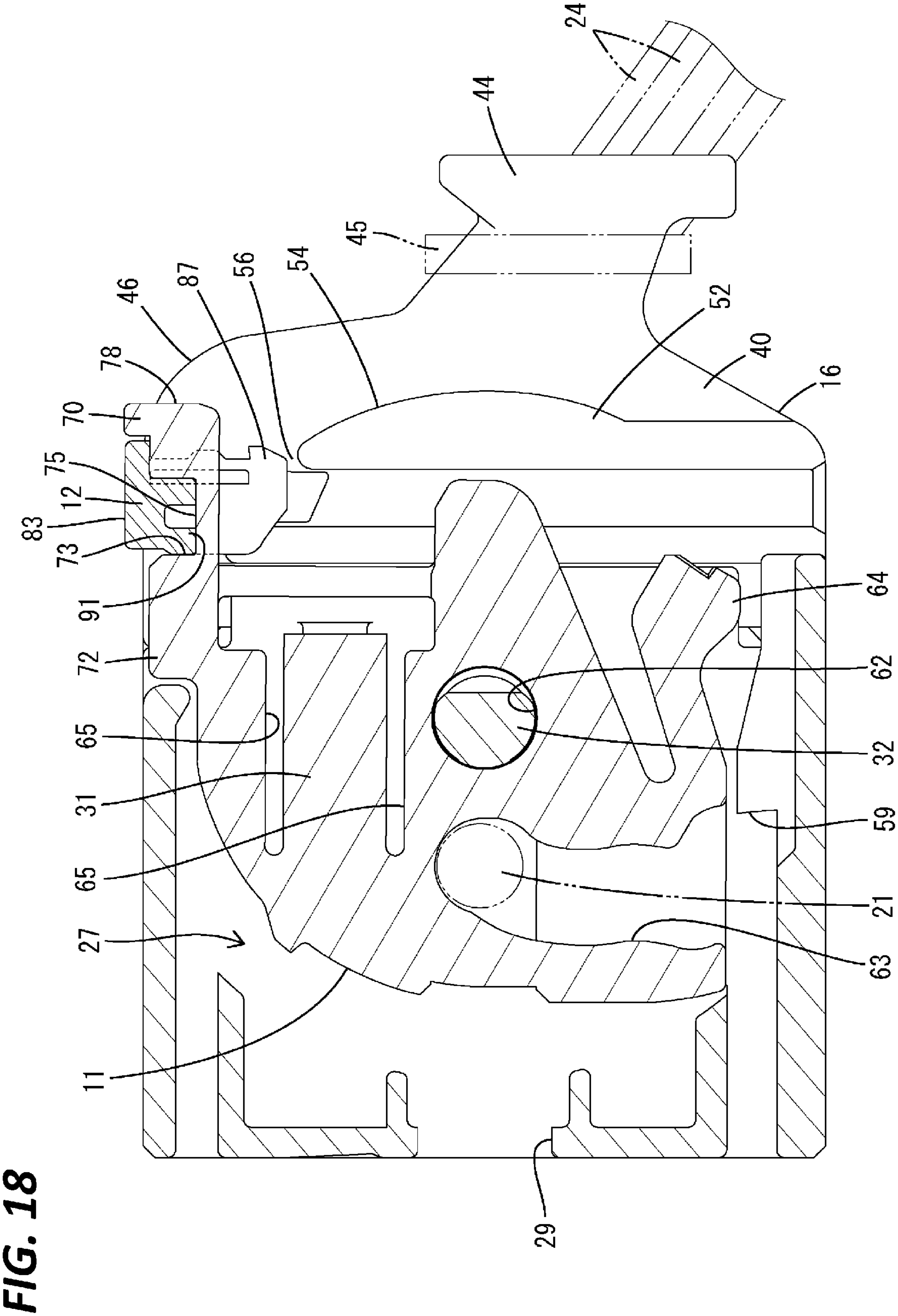
FIG. 18 is a plan view partly in section of the connector mounted with the cover having the one facing surface arranged on the upper surface side.

The draw-out tube 44 has wall surface parts connected to the both facing walls 40, 41 and extending along the width direction and a wall surface part connected to the back wall 39 and extending along the vertical direction, and is formed to project in a direction oblique to the front-rear direction. As shown in FIG. 18, the respective wires 24 are fastened to the draw-out tube 43 via a fastening means 45 such as a tie band.

As shown in FIG. 6, the cover 16 includes a closing portion 46 in one widthwise end part opposite to the wire draw-out opening 43. The closing portion 46 is a wall connected to the back wall 39 and extending along the vertical direction. Further, the closing portion 46 is arranged along the front-rear direction. The upper and lower ends of the closing portion 46 are connected to the both facing walls 40, 41.

As shown in FIG. 5, the both facing walls 40, 41 include upper and lower rail portions 47 respectively extending along the width direction on front ends. The both rail portions 47 are formed over the entire width on the inner surfaces of the both facing walls 40, 41. As shown in FIG. 2, the rail portions 47 have an uneven cross-sectional shape on the inner surfaces of the both facing walls 40, 41 and can be meshed with the meshing portions 35 of the housing 15.

As shown in FIG. 5, each of the both rail portions 47 includes a locking portion 48 in one widthwise end part. The locking portion 48 is formed to be deflectable and deformable by cutting the rail portion 47. The locking portion 48 includes a locking projection 49 projecting forward of the facing wall 40, 41.

The cover 16 is slid with respect to the housing 15 with the both rail portions 47 inserted in the both rail grooves 34 and fit to the meshing portions 35. Immediately before the cover 16 is properly mounted on the housing 15, the locking projections 49 ride on the back surfaces of the rail grooves 34 and the locking portions 48 are deflected and deformed. When the cover 16 is properly mounted on the housing 15, the locking portions 48 are resiliently restored, the locking projections 49 are fit into the lock receiving portions 36 and the cover 16 is held with movements with respect to the housing 15 restricted.

Figure 7:
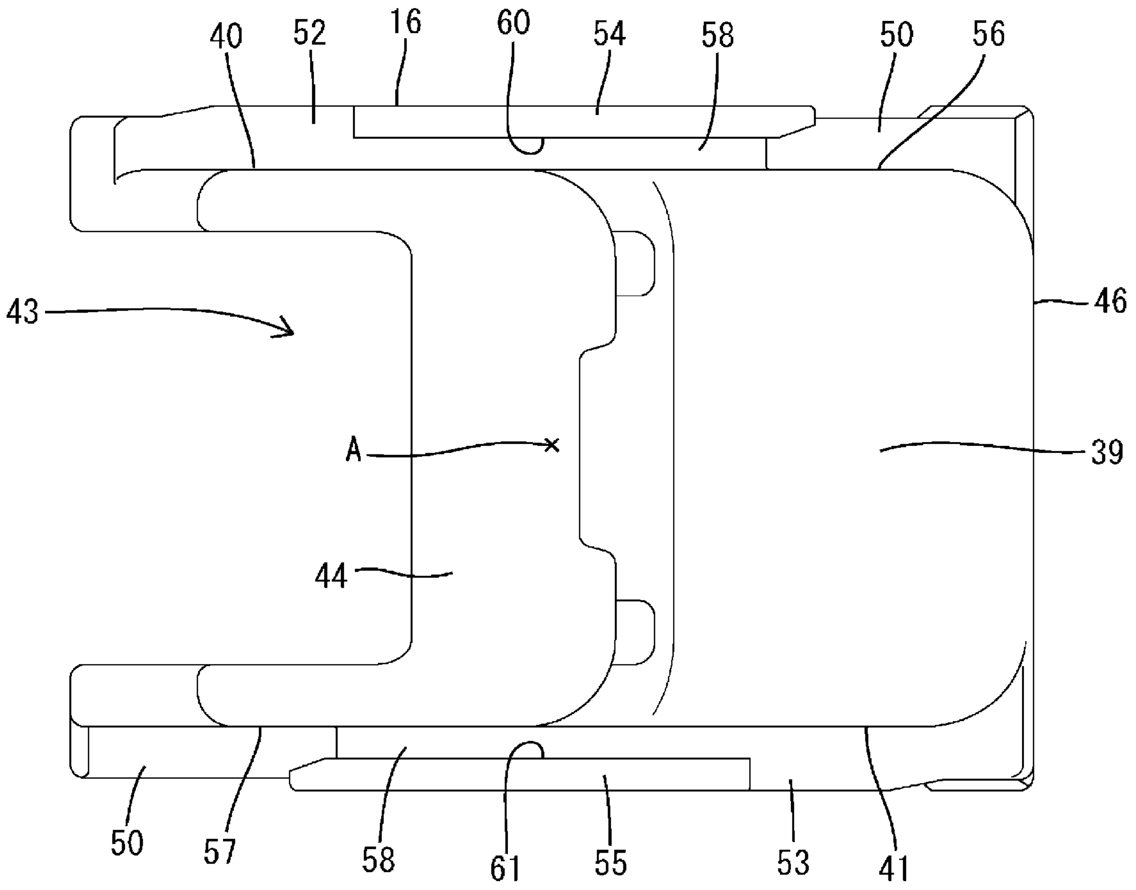
FIG. 7 is a back view of the cover.
Figure 12:
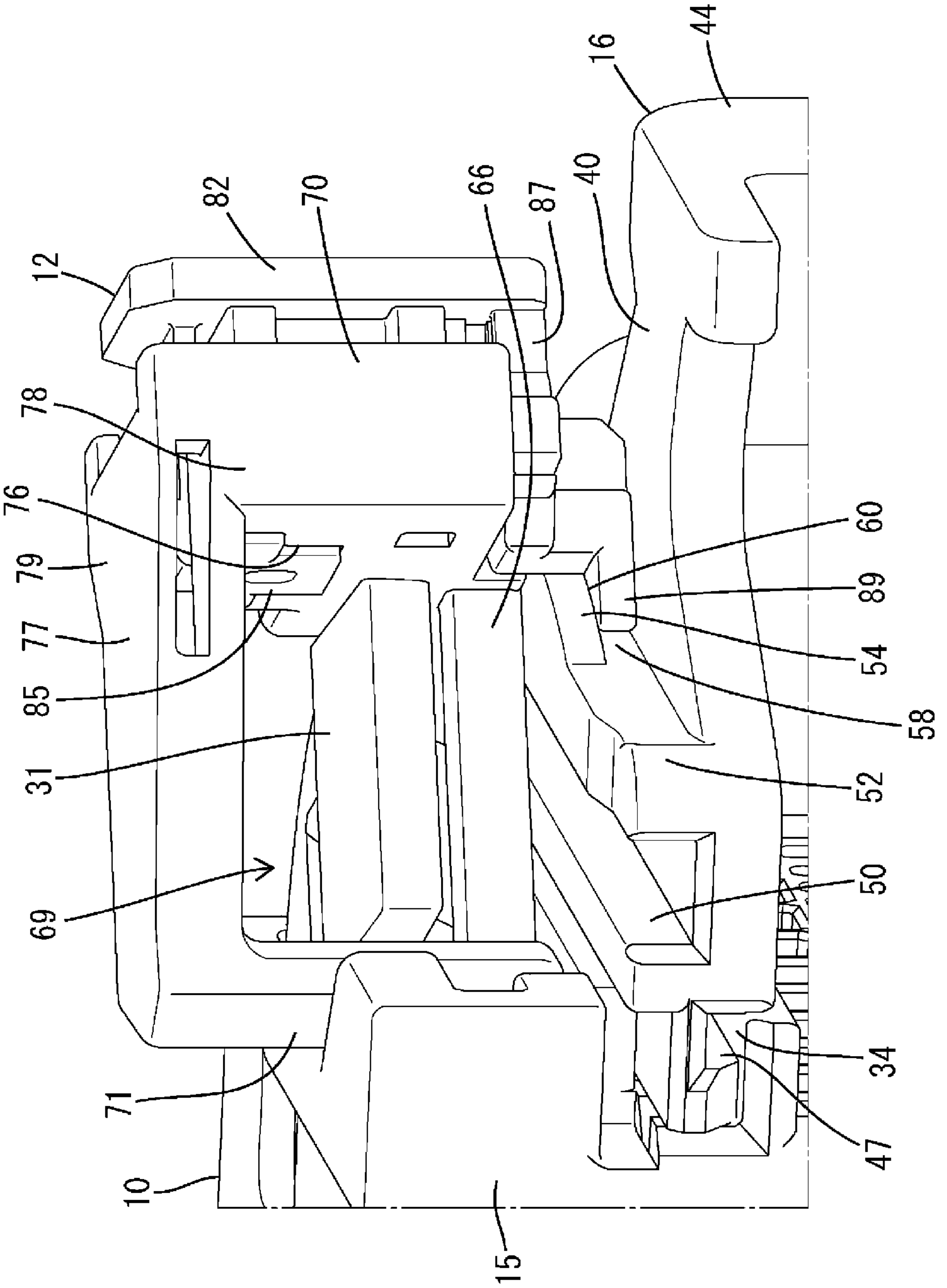
FIG. 12 is a partial enlarged perspective view of the connector in which the lever is at the partial locking position and the detecting member is at an initial position.
Figure 14:
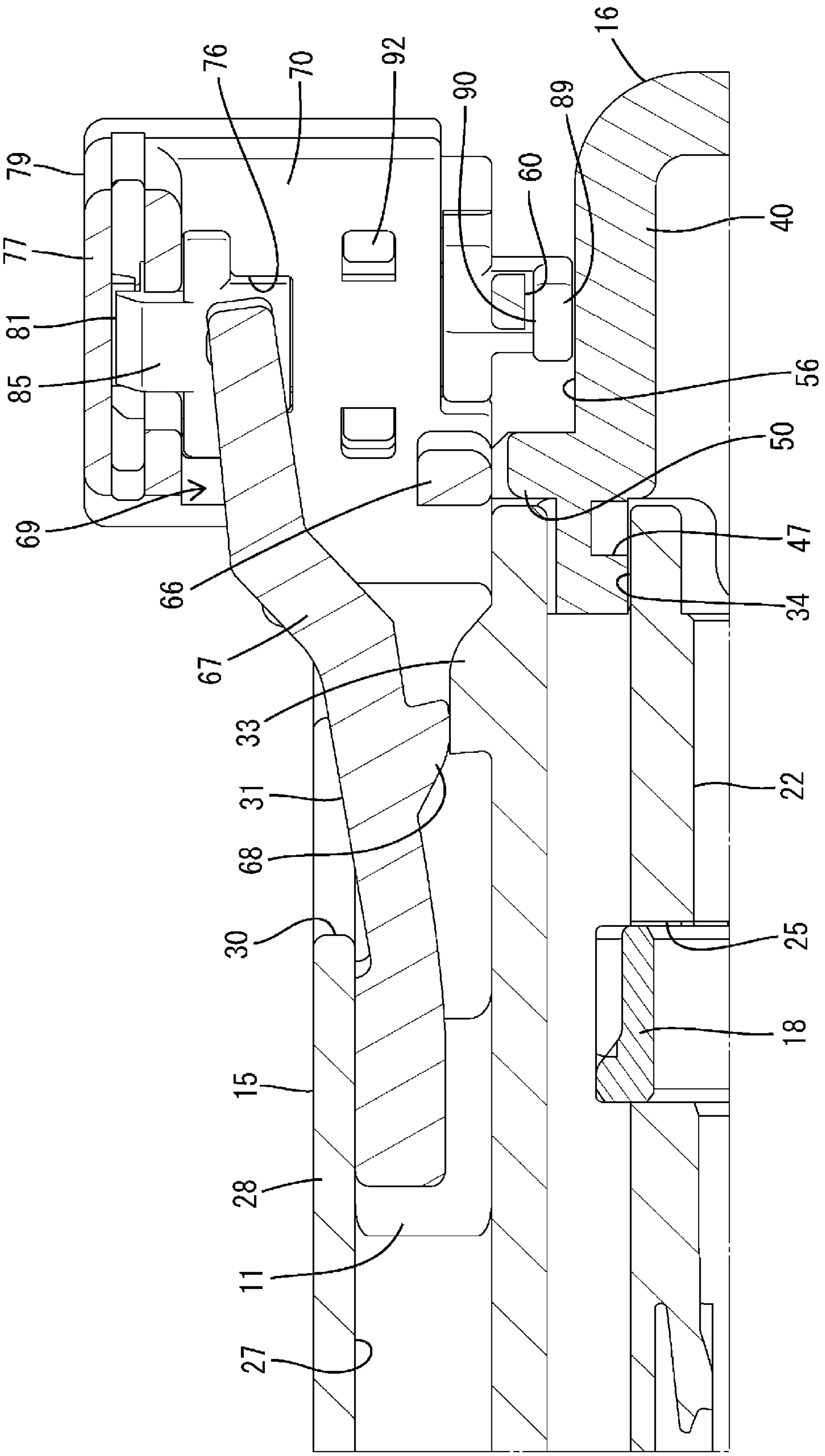
FIG. 14 is a partial enlarged side view in section of the connector in which a lock arm is deflected and deformed into a deflection space.

As shown in FIGS. 5 and 7, the both facing walls 40, 41 include guide portions 50 extending in the width direction on outer surfaces. As shown in FIGS. 12 and 14, the guide portion 50 is arranged to contactably face an opening end part of the rail groove 34 in the rear surface of the housing 15 when the cover 16 is mounted on the housing 15. Further, as shown in FIG. 5, the both facing walls 40, 41 include stopped portions 51 on the outer surfaces. The stopped portion 51 is in the form of a rectangular plate, connected to one widthwise end of the guide portion 50 and arranged in one widthwise end part of the facing wall 40, 41. When the cover 16 is properly mounted on the housing 15, the stopped portions 51 are fit into the corresponding cut portions 37 and butt against the stopper portions 38, thereby stopping a sliding movement of the cover 16. The stopper portions 38 are arranged outside tip sides of the locking portions 48.

As shown in FIG. 7, ribs 52, 53 extending in the width direction are provided to project behind the guide portions 50 on the outer surfaces of the both facing walls 41, 40. The rib (hereinafter, referred to as a first rib 52) provided on one facing wall 40, out of the both facing walls 40, 41, has one end (one end in an extending direction, one widthwise end) at a distance from the closing portion 46 and the other end (other end in the extending direction, widthwise other end) at a position continuous with the wire draw-out opening 43 as shown in FIG. 5. The rib (hereinafter, referred to as a second rib 53) provided on the other facing wall 41, out of the both facing walls 40, 41, has one end at a position continuous with the closing portion 46 and the other end at a distance from the wire draw-out portion 43 as shown in FIG. 6.

Figure 19:
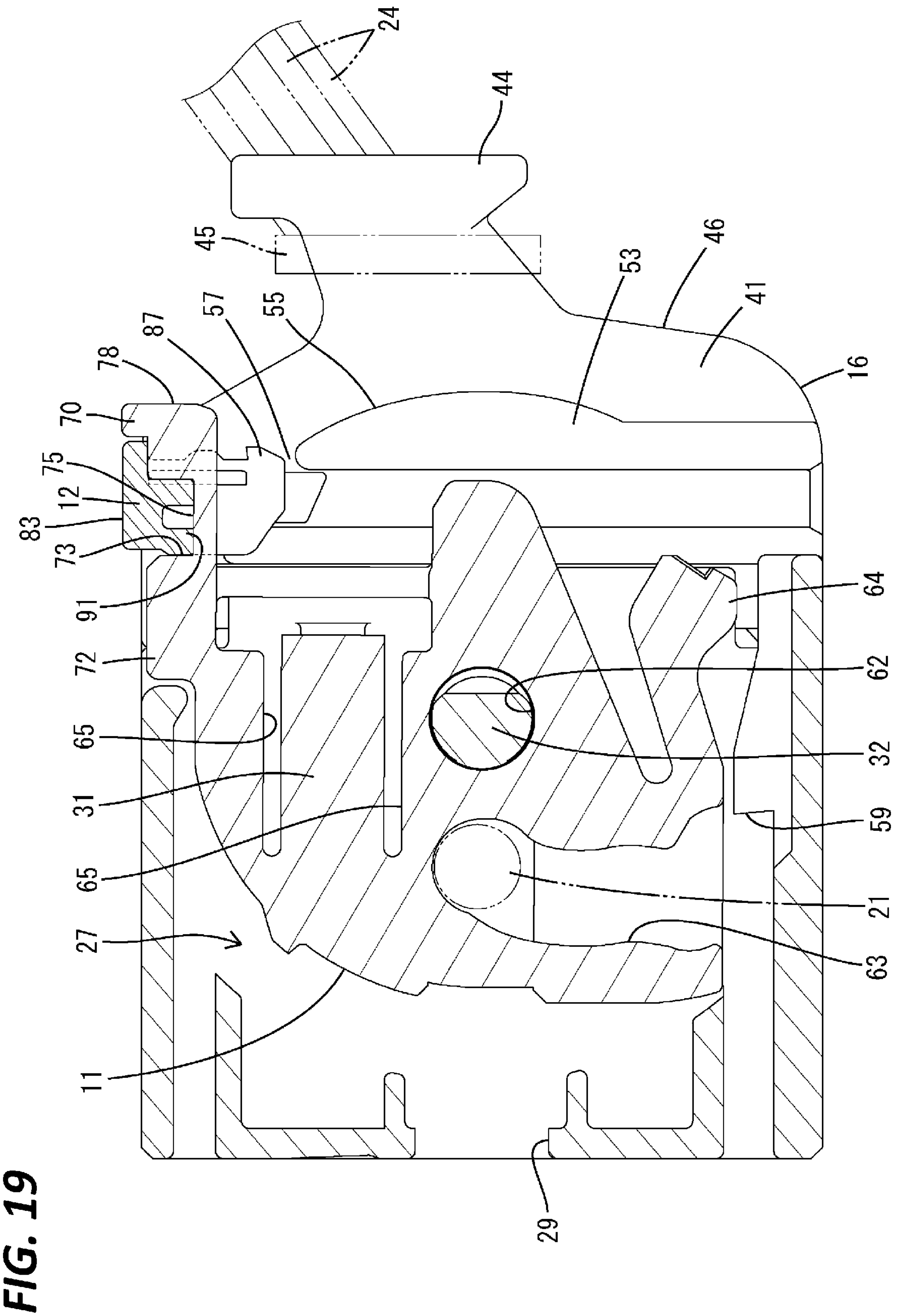
FIG. 19 is a plan view partly in section of the connector mounted with the cover having the other facing surface arranged on the upper surface side.

Further, the both facing walls 40, 41 include movement restricting portions 54, 55 on outer surfaces. The movement restricting portions 54, 55 are formed on the rear end edges (rear end surfaces) of the ribs 52, 53. The movement restricting portions 54, 55 restrict a movement of the detecting member 12 to a detection position to be described later. As shown in FIGS. 18 and 19, the movement restricting portions 54, 55 have an arcuate shape centered on the shaft portion 32 and extending in a rotating direction of the lever 11. Specifically, the movement restricting portions 54, 55 include a first movement restricting portion 54 formed on one widthwise side of the rear end edge of the first rib 52 and a second movement restricting portion 55 formed on the other widthwise side of the rear end edge of the second rib 53.

One end (one end in the extending direction, one widthwise end) of the first movement restricting portion 54 coincides with the one end of the first rib 52 and is set at a position at a distance from the closing portion 46. As shown in FIG. 5, a movement path (hereinafter, referred to as a first movement path 56) for moving the detecting member 12 to the detection position to be described later is formed between the one end of the first movement restricting portion 54 and the closing portion 46 on an outer surface side of the one facing wall 40. The other end (other end in the extending direction, other widthwise end) of the second movement restricting portion 55 coincides with the other end of the second rib 53 and is set at a position at a distance from the wire draw-out opening 43. As shown in FIG. 6, a movement path (hereinafter, referred to as a second movement path 57) for moving the detecting member 12 to the detection position is formed between the other end of the second movement restricting portion 55 and the wire draw-out opening 43 on an outer surface side of the other facing wall 41.

As shown in FIG. 7, the first and second movement restricting portions 54, 55 are point-symmetrically shaped with respect to a center position (see reference sign A of FIG. 7) of the cover 16 when the cover 16 is viewed from behind. That is, if the cover 16 is rotated by 180° about a center of a back view of the cover 16, the mutual arcuate shapes of the first and second movement restricting portions 54, 55 coincide and overlap. Similarly, the first and second ribs 52, 53 are also point-symmetrically shaped with respect to the center of the back view of the cover 16.

Further, as shown in FIG. 7, the cover 16 includes recesses 58 open in base end parts of the rear end edges of the ribs 52, 53 (base end parts in a projecting direction of the ribs 52, 53). The movement restricting portions 54, 55 are provided in regions outside the openings of the recesses 58 on the rear end edges of the ribs 52, 53.

The cover 16 includes pressing portions 60, 61 on inner side surfaces of the recesses 58 on the rear end edges of the ribs 52, 53. The pressing portions 60, 61 are arranged to be adjacent to the movement restricting portions 54, 55 on the inner side surfaces of the recesses 58 and face the outer wall surfaces of body parts of the facing walls 40, 41. As shown in FIG. 3, the pressing portions 60, 61 include a first pressing portion 60 orthogonal to the first movement restricting portion 54 on the outer surface side of the one facing wall 40 and a second pressing portion 61 orthogonal to the second movement restricting portion 55 on the outer surface side of the other facing wall 41.

<Lever>

Figure 8:
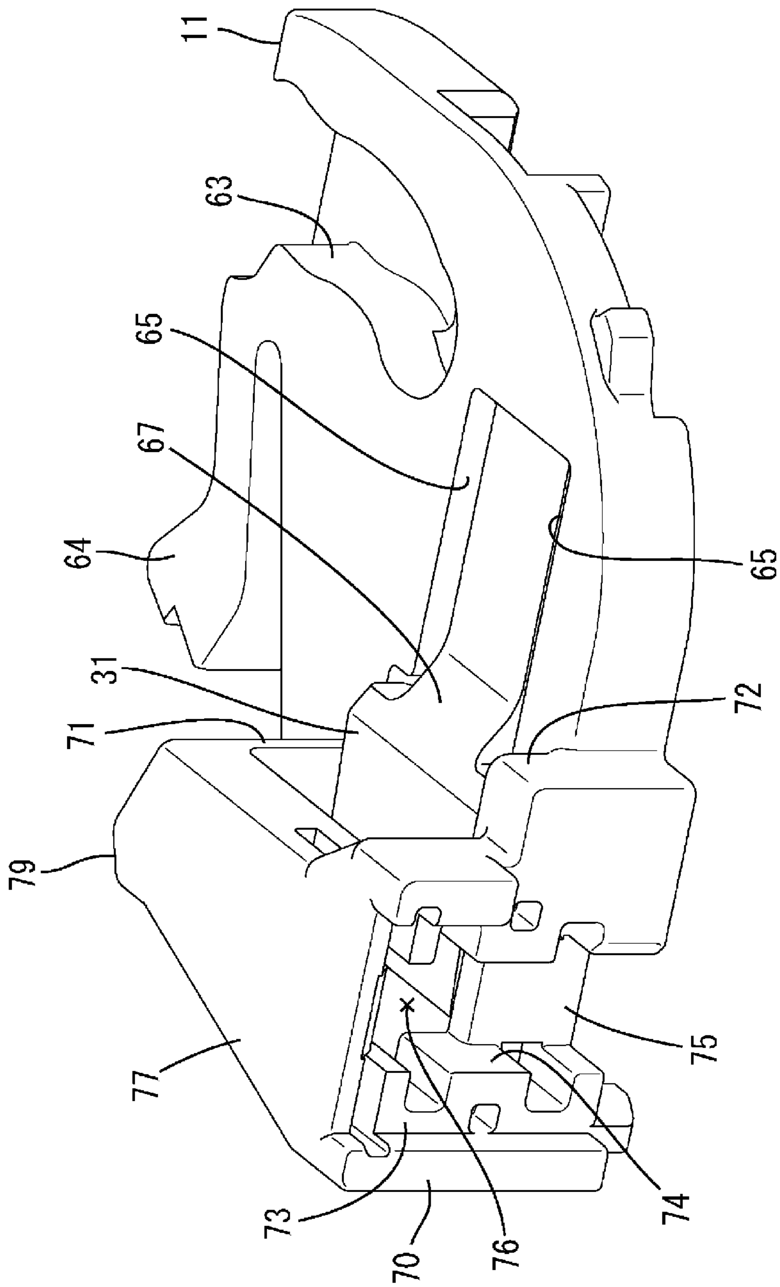
FIG. 8 is a perspective view of the lever.

The lever 11 is made of synthetic resin and, as shown in FIG. 8, in the form of one flat plate as a whole. As shown in FIG. 18, the lever 11 includes a bearing portion 62 in the form of a circular bottomed hole and a cam groove 63 extending from the vicinity of the bearing portion 62 to an outer peripheral edge.

The lever 11 is accommodated in the lever accommodation chamber 27 of the housing 15 with plate surfaces thereof extending along the width direction. The lever 11 is rotationally displaced to a partial locking position (see FIGS. 2, 12 and 13) and a full locking position (see FIGS. 1, 3 and 15 to 19) about the shaft portion 32 fit in the bearing portion 62. The lever 11 is so arranged that an entrance of the cam groove 63 is facing forward at the partial locking position. The entrance of the cam groove 63 communicates with the cam follower insertion groove 29 and the cam follower 21 enters this entrance when the connection of the connector body 10 and the mating housing 14 is started.

In the process of rotating the lever 11 toward the full locking position, the cam follower 21 slides on a groove surface of the cam groove 63 and the connection of the connector body 10 and the mating housing 14 proceeds. When the lever 11 reaches the full locking position, the entrance of the cam groove 63 is arranged to face toward the other widthwise side and the cam follower 21 is arranged on a back end side of the cam groove 63. In this way, the connector body 10 and the mating housing 14 are properly connected. Note that, in the following description of the structure of the lever 11, the front-rear direction, vertical direction and width direction are based on the front-rear direction, vertical direction and width direction in a state where the lever 11 is at the full locking position.

As shown in FIG. 8, the lever 11 includes a partial locking piece 64 cantilevered rearward on the outer peripheral edge of the other widthwise end side. The partial locking piece 64 is locked to a partial lock receiving portion 59 (see FIG. 18) in the lever accommodation chamber 27, whereby the lever 11 is restricted from moving from the partial locking position to the full locking position.

As shown in FIG. 8, the lever 11 includes the lock arm 31 cantilevered rearward from the vicinity of the back end of the cam groove 63 on one widthwise side. The lock arm 31 is in the form of a plate piece between slit portions 65 paired in the width direction in the lever 11. The lock arm 31 is deflectable and deformable in the vertical direction with a position near the front end of the lever 11 as a fulcrum.

Figure 15:
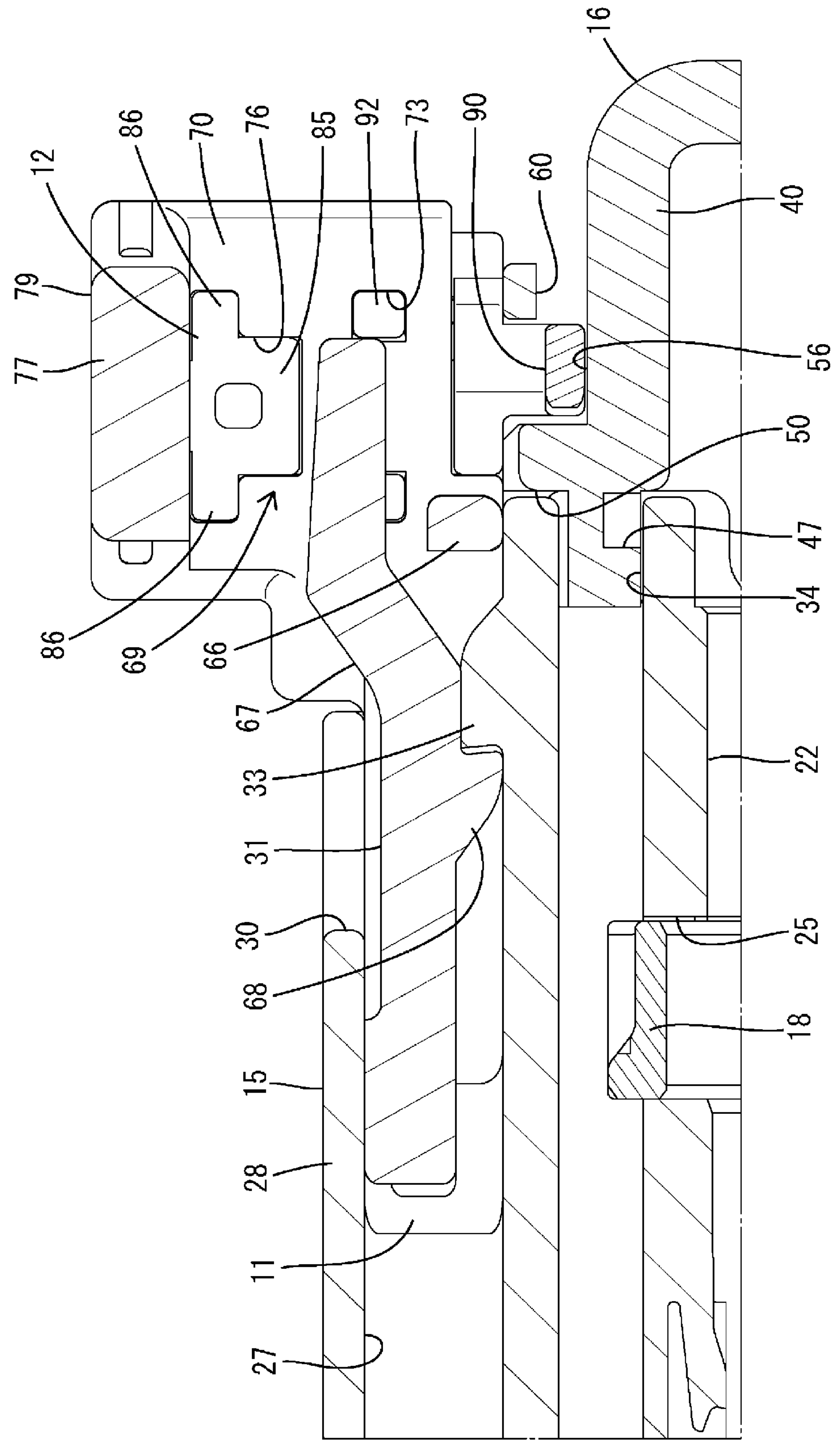
FIG. 15 is a partial enlarged side view in section of the connector in which the lock arm locks a lock portion and a movement of the detecting member to a detection position is allowed.

The lock arm 31 has a rear end part at a position higher than a front part. As shown in FIG. 15, an inclined portion 67 inclined with respect to the front-rear direction is provided between the rear end part and the front part of the lock arm 31. The lever 11 includes a bridge portion 66 bridged between the slit portions 65 below the rear end part of the lock arm 31 (see FIG. 12). By the abutment of the rear end part of the lock arm 31 on the bridge portion 66, downward deflection of the lock arm 31 is restricted.

As shown in FIGS. 14 and 15, the lock arm 31 includes a claw-like lock projection 68 at a position near the inclined portion 67 on the lower surface of the front part. The lock projection 68 is lockable to the lock portion 33 of the housing 15. By locking the lock projection 68 to the lock portion 33, the lever 11 is held at the full locking position with respect to the housing 15 and, consequently, the connector body 10 and the mating housing 14 are held in a connected state.

As shown in FIG. 8, the lever 11 includes protection walls 70, 71 shaped to stand on opening edge parts of the both slit portions 65 and facing the both side surfaces (end surfaces on both widthwise sides) of the rear end part of the lock arm 31 across a gap. Out of these, a front-rear length (front-rear length including a mounting portion 73 to be described later) of the protection wall on one widthwise side (hereinafter, referred to as a first protection wall 70) is longer than a front-rear length of the protection wall on the other widthwise side (hereinafter, referred to as a second protection wall 71).

The first protection wall 70 has a part located on one widthwise end of the lever 11 and projecting laterally. The first protection wall 70 includes a contact stop portion 72 in the form of a rectangular block projecting forward. As shown in FIGS. 1 and 18, when the lever 11 reaches the full locking position, the contact stop portion 72 contactably faces an edge part continuous with the arm escaping portion 30 on the rear end edge of the upper wall portion 28 and a rotating operation of the lever 11 is stopped. As shown in FIG. 12, the rear end surface of the first protection wall 70 is flat along the width direction and height direction and formed wider than the rear end surface of the second protection wall 71.

As shown in FIG. 8, the first protection wall 70 includes the mounting portion 73. The detecting member 12 is mounted into the mounting portion 73. The mounting portion 73 includes a recessed portion 74 recessed in the outer surface of the first protection wall 70, a wall surface portion 75 for closing a lower part of the back surface of the recessed portion 74 and an opening portion 76 open in an upper part of the back surface of the recessed portion 74. The mounting portion 73 is formed to penetrate through the first protection wall 70 in the width direction (wall thickness direction) via the opening portion 76 in an upper part. The recessed portion 74 includes groove parts penetrating in the width direction and communicating with the opening portion 76 at upper and lower positions of front and rear inner wall surfaces.

The lever 11 has a ceiling wall 77 linking the upper end of the first protection wall 70 and that of the second protection wall 71 and extending along the width direction. A front-rear dimension of the ceiling wall 77 gradually decreases from the side of the first protection wall 70 to the side of the second protection wall 71. The rear end surface of the ceiling wall 77 is arranged obliquely to the width direction in a plan view. As shown in FIG. 12, the respective rear end surfaces of the ceiling wall 77 and the first protection wall 70 constitute a flat lever pressing surface 78, which is pressed when the lever 11 is moved toward the full locking position.

In the lever 11, a frame portion 79 in the form of a gate-shaped frame constituted by the first protection wall 70, the second protection wall 71 and the ceiling wall 77 is formed between edge parts of the slit portions 65 in a rear end part on the one widthwise side.

Figure 13:
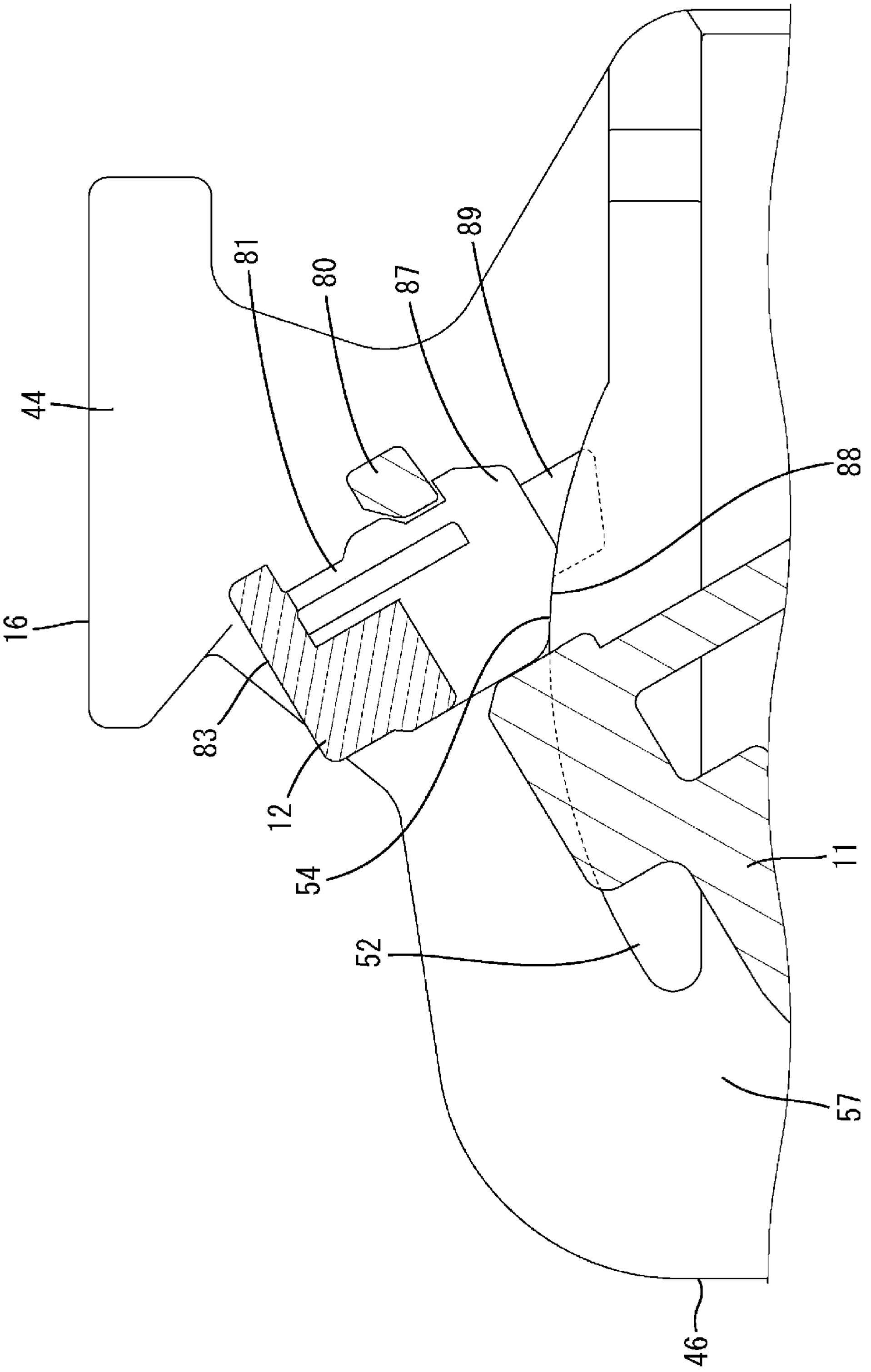
FIG. 13 is a partial enlarged plan view in section of the connector in a state of FIG. 12.
Figure 16:
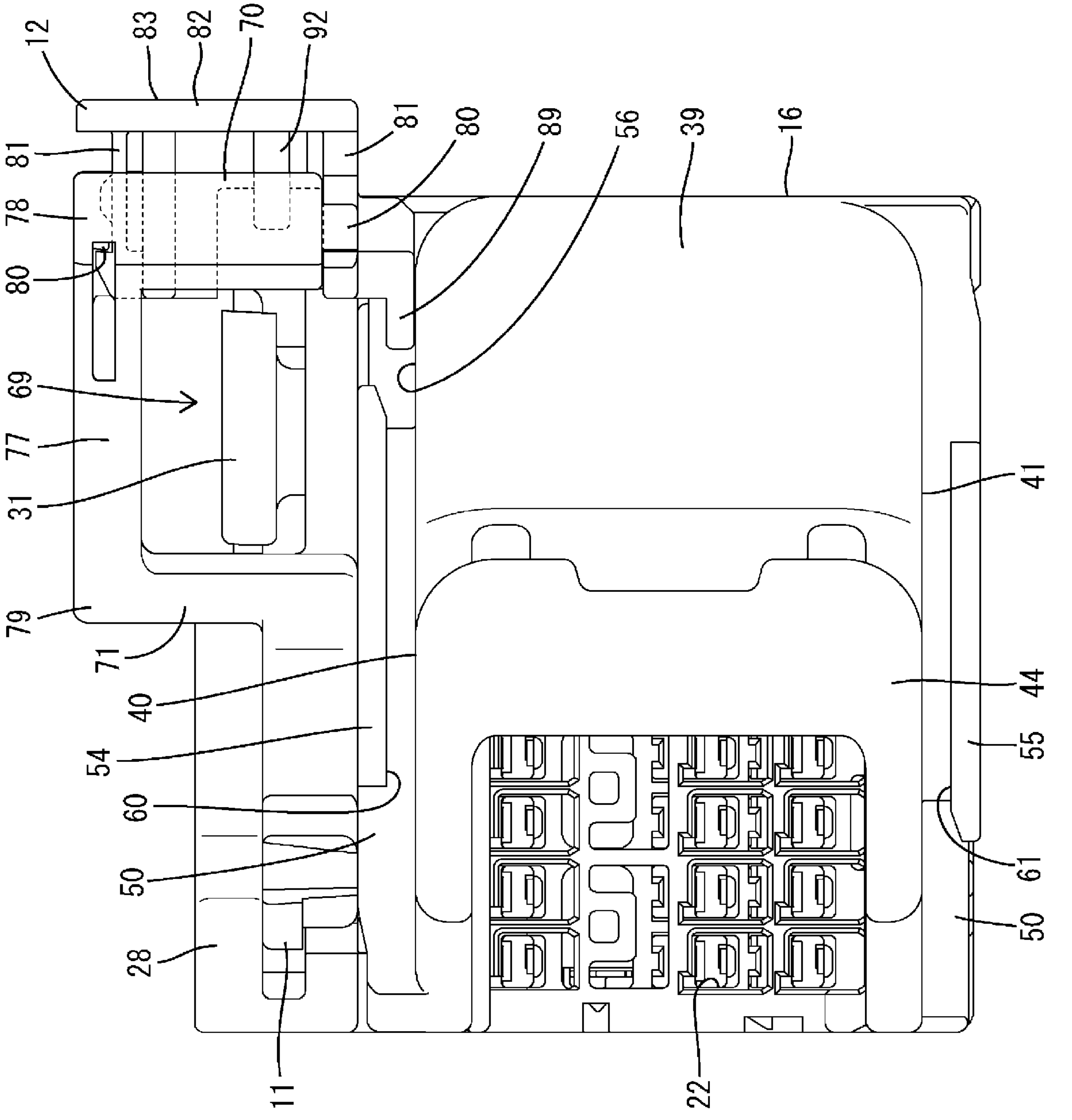
FIG. 16 is a back view of the connector in which the lever is at the full locking position and the detecting member is at the initial position.
Figure 17:
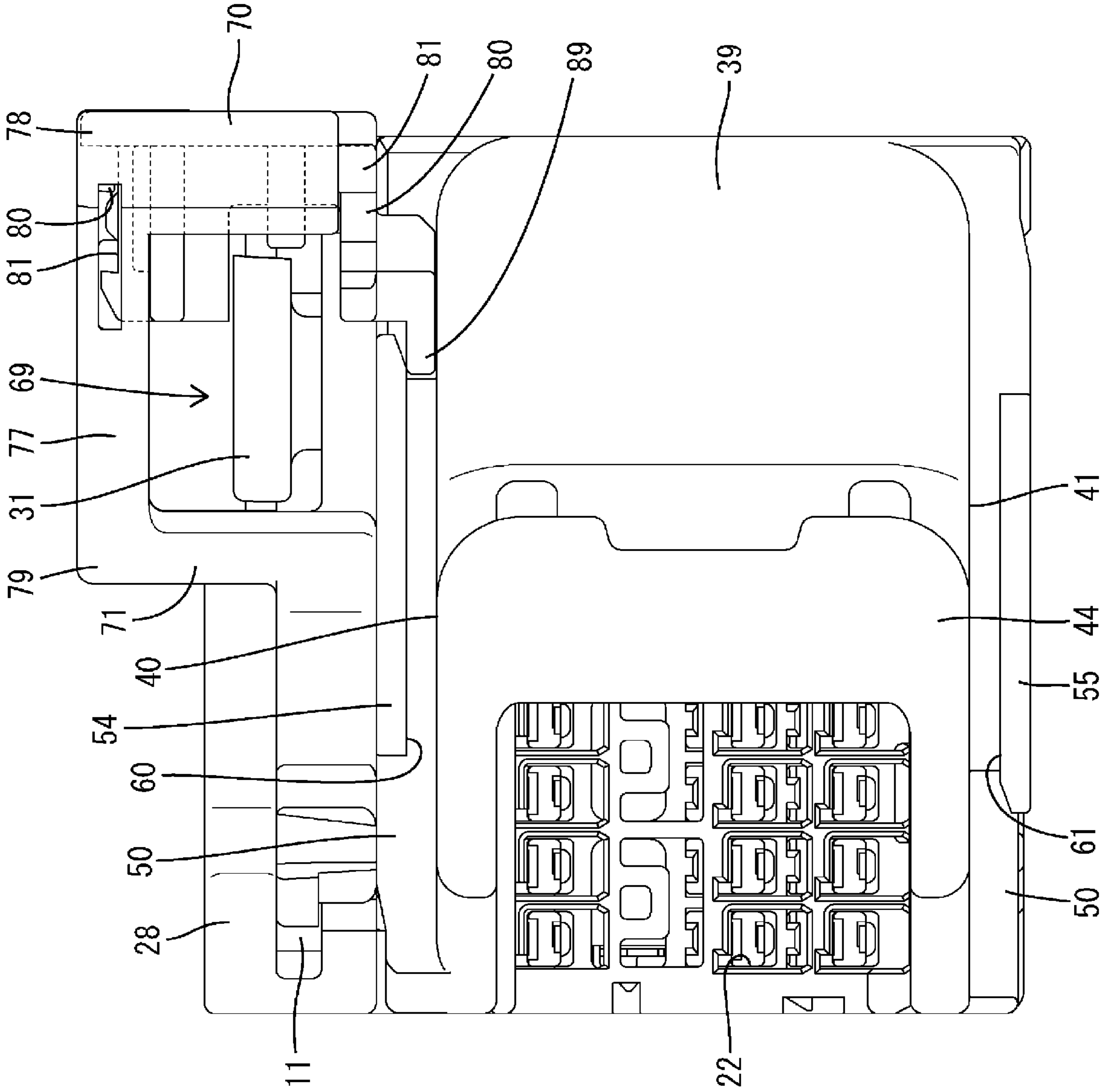
FIG. 17 is a back view of the connector in which the lever is at the full locking position and the detecting member is at a full locking position.

Further, the lever 11 includes locked portions 80 respectively inside the ceiling wall 77 and on the lower surface of the first protection wall 70 (see FIGS. 13, 16 and 17). The locked portions 80 can be locked by later-described resilient locking portions 81 of the detecting member 12.

<Detecting Member>

The detecting member 12 is made of synthetic resin and movable to a standby position (see FIGS. 2, 12 and 16) and the detection position (see FIGS. 1 and 17 to 19) with respect to the lever 11 while being held in the mounting portion 73 of the first protection wall 70. The standby position is a position where the detecting member 12 is held with respect to the lever 11 before the housing 15 and the mating housing 14 are properly connected. The detection position is a position reached by the detecting member 12 moved with respect to the lever 11 (lock arm 31) when the housing 15 and the mating housing 14 are properly connected. Further, a detecting direction to be described later is a moving direction of the detecting member 12 with respect to the lever 11 (lock arm 31) when the housing 15 and the mating housing 14 are properly connected. Note that, in the following description of the structure of the detecting member 12, the front-rear direction, vertical direction and width direction are based on the front-rear direction, vertical direction and width direction of the detecting member 12 held in the mounting portion 73 of the first protection wall 70 when the lever 11 is at the full locking position.

Figure 9:
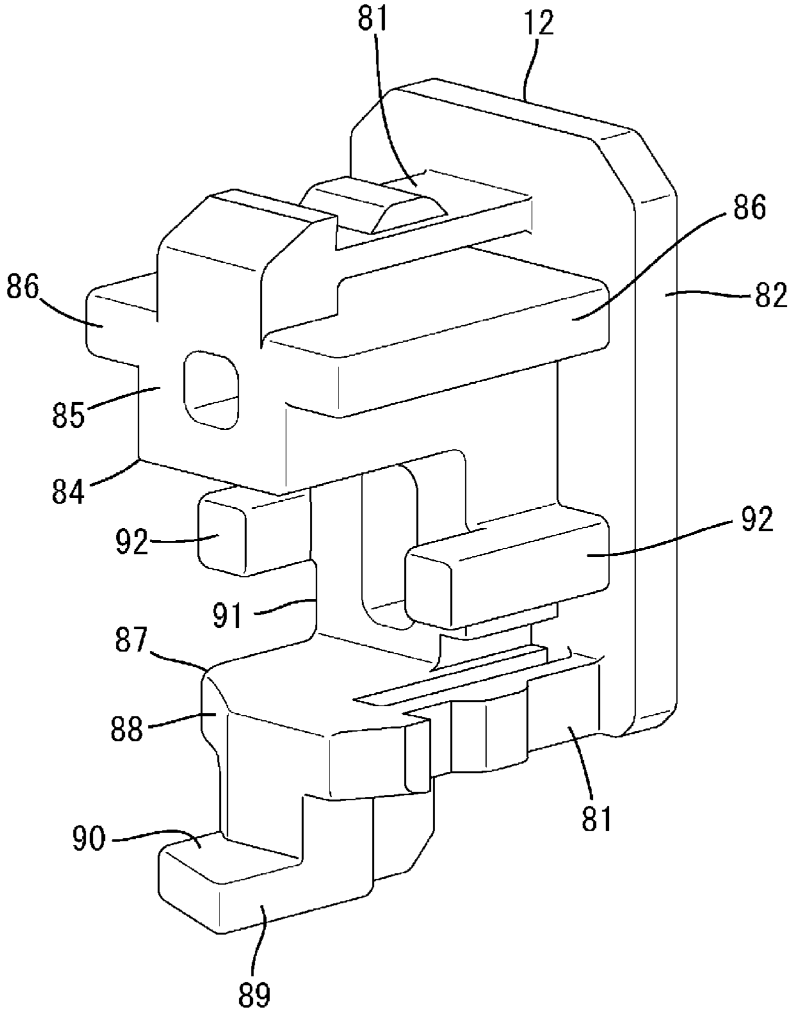
FIG. 9 is a perspective view of a detecting member.
Figure 10:
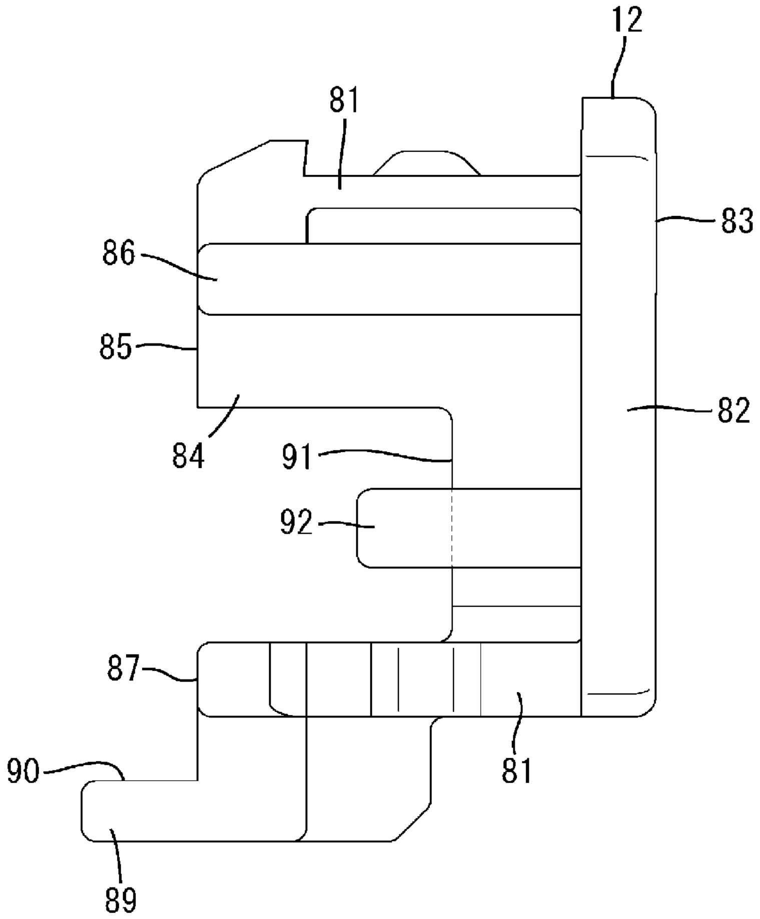
FIG. 10 is a back view of the detecting member.
Figure 11:
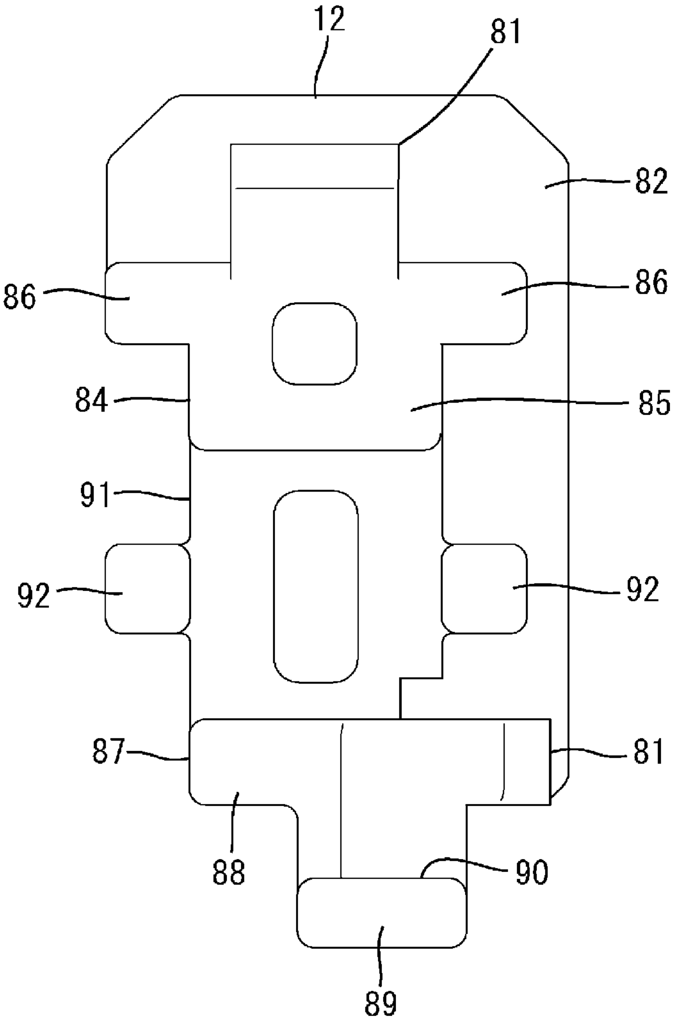
FIG. 11 is a side view of the detecting member.

As shown in FIGS. 9 to 11, the detecting member 12 includes a base portion 82 in the form of a flat plate on one widthwise end. As shown in FIG. 1, an end surface on the one widthwise side of the base portion 82 serves as a flat detecting member pressing surface 83 extending along the front-rear direction and vertical direction. As shown in FIG. 9, the detecting member 12 includes a detecting piece 84 projecting toward the other widthwise side from an upper part of the base portion 82. An end surface on the other widthwise side of the detecting piece 84 is a flat restricting surface 85 extending along the vertical direction and front-rear direction.

The detecting piece 84 includes rib-like portions 86 protruding in the front-rear direction from a rectangular column-like body part and extending in the width direction. As shown in FIG. 15, the rib-like portions 86 are fit into the groove parts of the opening portion 76. Further, as shown in FIGS. 9 and 10, the detecting piece 84 includes an upper resilient locking portion 81 extending between a tip part of the upper surface of the detecting piece 84 and the front surface of the base portion 82. The resilient locking portion 81 is supported on both ends and deflectable and deformable in the vertical direction with a front end connected to the rectangular column-like body part and a rear end connected to the base portion 82 as fulcrums. The resilient locking portion 81 includes projection parts projecting upward respectively in the other end part and intermediate part in the width direction.

The detecting member 12 includes an engaging piece 87 projecting toward the other widthwise side from a lower part of the base portion 82. As shown in FIG. 9, the engaging piece 87 includes a slit part extending along the width direction in a rear end part of a plate-like body part and a lower resilient locking portion 81 outside the slit part. The resilient locking portion 81 is supported on both ends and deflectable and deformable in a direction to narrow a front-rear width of the slit part (front-rear direction). The resilient locking portion 81 includes projection parts projecting rearward respectively in the other end part and intermediate part in the width direction. As shown in FIG. 16, the upper and lower resilient locking portions 81 are resiliently locked to the upper and lower locked portions 80, whereby the detecting member 12 is retained and held at the partial locking position with respect to the lever 11.

As shown in FIG. 9, the engaging piece 87 includes a movement restricted portion 88 in the form of a slope with a chamfered front corner on an end surface on the other widthwise side (surface on the detection position side) of the plate-like body part. As shown in FIG. 13, the movement restricted portion 88 of the engaging piece 87 can slide on and contact the movement restricting portion 54, 55 in the rotation process of the lever 11.

As shown in FIGS. 9 and 10, the engaging piece 87 has a bent part projecting toward the other widthwise side after projecting downward from the tip part of the plate-like body part described above and a pressed portion 90 on the upper surface (surface facing a side opposite to a side facing the outer surface of the connector body 10 (outer surface of the facing wall 40, 41 of the cover 16) of the projecting portion 89 toward the other widthwise side in the bent part. As shown in FIG. 12, the projecting portion 89 of the engaging piece 87 is fittable into the recess 58. As shown in FIGS. 12 and 14, the pressed portion 90 of the projecting portion 89 contactably faces the pressing portion 60, 61. The pressed portion 90 abuts on the pressing portion 60, 61, thereby hindering a displacement of the detecting member 12 in a direction away from the outer surface of the facing wall 40, 41.

As shown in FIGS. 9 to 11, the detecting member 12 includes a coupling portion 91 in a vertical intermediate part between the detecting piece 84 and the engaging piece 87. Base end parts of the detecting piece 84 and the engaging piece 87 are coupled via the coupling portion 91. End surfaces of the coupling portion 91 on the other widthwise side and front and rear sides are formed flat along the vertical direction. Further, the detecting member 12 includes a guide rib 92 extending from the base portion 82 toward the other widthwise side while being coupled to the front and rear end surfaces of the coupling portion 91. A tip part of the guide rib 92 projects further toward the other widthwise side than the end surface of the coupling portion 91 on the other widthwise side. As shown in FIG. 15, the tip part of the guide rib 92 is fit into the lower groove part of the mounting portion 73.

<Assembling Structure and Connection Structure of Connector>

In assembling, the detecting member 12 is laterally inserted into the mounting portion 73 of the first protection wall 70 located on the one widthwise side, which is one lateral side of the lock arm 31. As shown in FIGS. 13 to 16, the respective locked portion 80 are resiliently fit between the projection parts of the respective resilient locking portions 81, whereby the detecting member 12 is held at the partial locking position with respect to the lever 11.

When the detecting member 12 is at the standby position, the tip part (other widthwise end part) of the detecting piece 84 is arranged to enter the opening portion 76. As shown in FIG. 12, the restricting surface 85 of the detecting piece 84 is exposed on the inner side surface of the first protection wall 70 and faces the deflection space 69 of the lock arm 31 at the standby position, but is not arranged at a position interfering with the lock arm 31. Further, when the detecting member 12 is at the standby position, the rib-like portions 86 and the guide rib 92 are fit into the respective groove parts of the mounting portion 73 and the tip part of the engaging piece 87 is arranged along the lower surface of the first protection wall 70 (lower surface of the lever 11). The base portion 82 is arranged away from the first protection wall 70 toward the one widthwise side at the standby position.

The lever 11 is inserted into the lever accommodation chamber 27 of the housing 15 from behind. After the upper wall portion 28 is deflected and deformed, the shaft portion 32 of the housing 15 is fit into the bearing portion 62 of the lever 11. Then, the lever 11 is held at the partial locking position with respect to the housing 15 by the locking of the partial locking piece 64 and the partial lock receiving portion 59. As shown in FIG. 2, at the partial locking position, the lever 11 largely projects rearwardly of the housing 15 and locates the frame portion 79 and the lock arm 31 behind the housing 15.

Further, the cover 16 is mounted on the housing 15. For example, if it is desired to draw out the wires 24 rearward and toward the other widthwise side as shown in FIG. 18, the cover 16 is slid from the one widthwise side toward the other widthwise side while the rail portions 47 are placed along the rail grooves 34. The stopped portions 51 butt against the stopper portions 38 in the cut portions 37 and the locking portions 48 are resiliently locked to the lock receiving portions 36, whereby the cover 16 is held at a proper mount position with respect to the housing 15 with movements restricted. As shown in FIG. 2, the rail portions 47 are meshed with the meshing portions 35, whereby the separation of the cover 16 from the housing 15 is restricted.

As described above, if the cover 16 is properly mounted on the housing 15, the closing portion 46 is arranged on the one widthwise end side and the wire draw-out opening 43 is arranged on the other widthwise end side. Further, the lever 11 is arranged along the upper surface of the one facing wall 40 and the first movement path 56 is arranged on the one widthwise end side.

If the lever 11 is at the partial locking position and the detecting member 12 is at the standby position, the movement restricted portion 88 of the engaging piece 87 is arranged to contactably face the first movement restricting portion 54 from behind, the projecting portion 89 of the engaging piece 87 is fit into the recess 58 of the first rib 52, and the pressed portion 90 of the projecting portion 89 is arranged to contactably face the first pressing portion 60 from inside as shown in FIG. 2. Then, the detecting member 12 is arranged near one lateral side of the draw-out tube 44.

Subsequently, the connector body 10 is connected to the mating housing 14. With the connector body 10 lightly fit in the receptacle 19 of the mating housing 14 and the cam follower 21 located in the entrance of the cam groove 63, the locking of the partial locking piece 64 and the partial lock receiving portion 59 is released by the mating housing 14. A worker presses the lever pressing surface 78 toward the one widthwise side, whereby the lever 11 is rotationally displaced toward the full locking position. In the rotation process of the lever 11, the movement restricted portion 88 of the engaging piece 87 abuts and slide on the first movement restricting portion 54, whereby the detecting member 12 is restricted from moving toward the detection position. Further, the pressed portion 90 of the projecting portion 89 abuts on the first pressing portion 60, whereby the lift of the detecting member 12 from the outer surface of the one facing wall 40 is suppressed.

Immediately before the lever 11 reaches the full locking position, the movement restricted portion 88 of the engaging piece 87 is separated from the first movement restricting portion 54 and faces the first movement path 56. Further, immediately before the lever 11 reaches the full locking position, the lock projection 68 interferes with the lock portion 33 and the lock arm 31 is deflected and deformed into the deflection space 69 located above as shown in FIG. 14. In this stage, even if an attempt is made to move the detecting member 12 to the detection position toward the other widthwise side, the restricting surface 85 of the detecting piece 84 abuts on one side surface of the lock arm 31, whereby the detecting member 12 does not reach the detection position.

When the lever 11 reaches the full locking position, the lock arm 31 is resiliently restored and, as shown in FIG. 15, the lock projection 68 is arranged to face and be lockable to the lock portion 33 from front. In this way, a rearward rotational displacement of the lever 11 is restricted. As shown in FIG. 1, the stop contact portion 72 abuts on the rear end edge of the upper wall portion 28, whereby a forward rotational displacement of the lever 11 is also restricted. Further, a rear part of the lock arm 31 is arranged in the arm escaping portion 30 of the upper wall portion 28.

The lock arm 31 is resiliently restored, whereby the detecting piece 84 can enter the deflection space 69. As described above, the movement restricted portion 88 of the engaging piece 87 is also already arranged to be able to enter the first movement path 56. Thus, if the worker presses the detecting member pressing surface 83 toward the other widthwise side, the projection parts of the respective resilient locking portions 81 ride on the respective locked portions 80 and the detecting member 12 becomes movable toward the detection position. In the process of moving the detecting member 12 to the detection position, the rib-like portions 86 and the guide rib 92 slide in the respective groove parts of the mounting portion 73 to guide a moving operation of the detecting member 12.

If the detecting member 12 reaches the detection position, the projection parts of the respective resilient locking portions 81 are arranged to contactably face the respective locked portions 80 from the other widthwise side as shown in FIG. 17. In this way, the detecting member 12 is restricted from moving to an initial position in a return direction. Further, the other widthwise end surface of the coupling portion 91 contactably faces the wall surface portion 75 as shown in FIG. 18, whereby the detecting member 12 is restricted from moving further toward the other widthwise side than the detection position.

When the detecting member 12 reaches the detection position, the detecting piece 84 is arranged in the deflection space 29 as shown in FIG. 17. In this way, upward deflection of the lock arm 31 is restricted by the detecting piece 84 and a locked state of the lock arm 31 and the lock portion 33 is maintained. Further, as shown in FIG. 18, the engaging piece 87 enters the first movement path 56 to escape. The base portion 82 is fit into the recessed portion 74 and entirely accommodated in the mounting portion 73. Thus, the detecting member 12 has no part projecting from the first protection wall 70 at the detection position.

On the other hand, if it is desired to draw out the wires 24 rearward and toward the one widthwise side as shown in FIG. 19, contrary to the above mode (mode in which the wires 24 are drawn out rearward and toward the other widthwise side), the cover 16 is inverted from the aforementioned posture and slid from the other widthwise side toward the one widthwise side while the rail portions 47 are placed along the rail grooves 34.

If the cover 16 is properly mounted on the housing 15, the closing portion 46 is arranged on the other widthwise end side and the wire draw-out opening 43 is arranged on the one widthwise end side as shown in FIG. 19. Further, the lever 11 is arranged along the upper surface of the other facing wall 41 and the second movement path 57 is arranged on the one widthwise end side. The forms (shapes, arrangement) of the second movement restricting portion 55 and the second pressing portion 61 on the upper surface side of the cover 16 are the same as in the above mode. Thus, as in the above mode, the lever 11 can be rotated and the detecting member 12 can be moved.

As described above, according to the connector of this embodiment, the following effects can be achieved.

The detecting member 12 is arranged at a position facing one side surface, out of both side surfaces of the lock arm 31. The both side surfaces of the lock arm 31 are surfaces facing both sides in the width direction orthogonal to the front-rear direction, which is a length direction of the lock arm 31, and the vertical direction, which is a deflecting direction of the lock arm 31. Thus, it is possible to avoid the enlargement of the connector in the front-rear direction and vertical direction due to the presence of the detecting member 12.

The detecting member 12 becomes movable from the one side surface side toward the other side surface side with respect to the lock arm 31 when the connector body 10 and the mating housing 14 are properly connected. Thus, the detecting member 12 can be easily brought to the detection position by being pushed toward the other widthwise side.

The detecting member 12 is movably held in the mounting portion 73 provided in the first protection wall 70 facing the one side surface of the lock arm 31. Since the first protection wall 70 has both a protection function of protecting the lock arm 31 from the one widthwise side and a holding function of holding the detecting member 12, the configuration of the connector can be simplified as compared to the case where the both functions are separately provided.

The lock arm 31 is provided in the lever 11. The detecting member 12 is held by the lever 11. Thus, the lock arm 31 can be omitted from the housing 15 and the housing 15 needs not be provided with a structure for holding the detecting member 12. Thus, the configuration of the housing 15 can be simplified.

The lever 11 has, on the frame portion 79, the lever pressing surface 78 exposed rearward in a connecting direction and to be pressed when the lever 11 is rotated to the full locking position. The detecting member 12 has, on the base portion 82, the detecting member pressing surface 83 exposed rearward in the detecting direction and to be pressed when the detecting member 12 is moved to the detection position. When the lever 11 is at the full locking position, the lever pressing surface 78 is arranged to face rearward and the detecting member pressing surface 83 is arranged to face toward the one widthwise side as shown in FIGS. 18 and 19. That is, the lever pressing surface 78 and the detecting member pressing surface 83 are arranged to face in directions different from each other. Thus, in rotating the lever 11 toward the full locking position, the lever pressing surface 78 can be pressed without touching the detecting member pressing surface 83. Further, in moving the detecting member 12 toward the detection position, the detecting member pressing surface 83 can be pressed without touching the lever pressing surface 78. Thus, the rotating operation of the lever 11 and the moving operation of the detecting member 12 can be smoothly performed without interfering with each other.

Further, in the case of this embodiment, the detecting member 12 abuts on the movement restricting portion 54, 55 and is restricted from moving to the detection position with respect to the lever 11 before the connector body 10 and the mating housing 14 are properly connected.

Conventionally, in the case of a connector including a cantilever having one center axis of rotation, a movement restricting portion only has to be provided on only a facing wall on a side where the lever is arranged, out of both facing walls of a cover.

In contrast, in the case of this embodiment, the movement restricting portions 54, 55 are provided on the both facing walls 40, 41. Further, the respective movement restricting portions 54, 55 are point-symmetrically shaped with respect to the center (see reference sign A of FIG. 7) of the back view of the cover 16. Thus, the cover 16 can be reversibly (reversed in the lateral direction) used. As a result, a draw-out direction of the wires 24 can be easily changed only by rotating the cover 16 by 180° (see FIGS. 18 and 19).

Out of the both facing walls 40, 41, the one facing wall 40 has the first movement path 56 between the one widthwise end of the first movement restricting portion 54 and the closing portion 46 and the other facing wall 41 has the second movement path 57 between the other widthwise end of the second movement restricting portion 55 and the wire draw-out opening 43. Thus, a mounting posture of the cover 16 can be confirmed, using the shapes of the first movement path 56, the closing portion 46, the second movement path 57 and the wire draw-out opening 43 as a guide, and erroneous mounting of the cover 16 on the housing 15 can be prevented.

Further, in the case of this embodiment, the connector body 10 includes the movement restricting portions 54, 55 and the pressing portions 60, 61 on the outer surface side. The movement restricting portion 54, 55 can abut on the detecting member 12 from the side of the detection position. The pressing portion 60, 61 can abut on the detecting member 12 from an outer position. Since the connector body 10 includes the pressing portions 60, 61 in addition to the movement restricting portions 54, 55, a displacement of the detecting member 12 in a direction away from the outer surface side of the facing wall 40, 41 can be hindered. As a result, a state where the detecting member 12 abuts on the movement restricting portion 54, 55 can be ensured and the reliability of connection detection by the detecting member 12 can be improved. Particularly, in the case of this embodiment, since the lever 11 is of a cantilevered type disposed only on the outer surface side of either one of the both facing walls 40, 41, the lever 11 is easily separated from the outer surface side of the facing wall 40, 41 and it is greatly beneficial that the lift of the detecting member 12 can be suppressed by the pressing portion 60, 61.

The movement restricting portions 54, 55 and the pressing portions 60, 61 are collectively provided on rear edge parts (projecting end parts) of the ribs 52, 53 on a side facing the detecting member 12. Thus, the structure of the connector body 10 can be simplified as compared to the case where the movement restricting portions 54, 55 and the pressing portions 60, 61 are provided on separate parts.

The connector body 10 has the movement paths 56, 57 on the outer surface of the cover 16. The movement paths 56, 57 are facing end parts in the extending direction of the movement restricting portions 54, 55. The detecting member 12 includes the detecting piece 84 to be arranged in the deflection space 69 of the lock arm 31 at the detection position. Thus, even if the detecting member 12 is separated from the movement restricting portion 54, 55 and reaches the position facing the movement path 56, 57, a movement of the detecting member 12 to the detection position is restricted by the abutment of the restricting surface 85 of the detecting piece 84 on the lock arm 31 deflected and deformed into the deflection space 69. Thus, an unexpected movement of the detecting member 12 to the detection position can be satisfactorily prevented before the connector body 10 and the mating housing 14 are properly connected.

Other Embodiments

The embodiment disclosed this time should be considered illustrative in all aspects, rather than restrictive.

Although the detecting member is arranged on the one widthwise side, out of the both widthwise sides of the lock arm, in the case of the above embodiment, the detecting member may be arranged on the other widthwise side, out of the both widthwise sides of the lock arm, as another embodiment.

Although the lock arm is configured to lock the housing in the case of the above embodiment, the lock arm may be configured to lock the mating housing as another embodiment.

Although the lock arm is provided in the lever in the case of the above embodiment, the lock arm may be provided in the housing as another embodiment.

Although the movement restricting portion is formed on the rear end edge of the rib in the case of the above embodiment, the movement restricting portion may be formed on the back surface of the recess as another embodiment. If the movement restricting portion is formed on the back surface of the recess, the movement restricting portion may be formed on the end surface of the projecting portion of the engaging piece. Further, both the rear end edge of the rib and the back surface of the recess may be formed into movement restricting portions.

Although the movement restricting portion and the pressing portion are provided on the rib in the case of the above embodiment, the movement restricting portion and the pressing portion may be provided on separate parts as another embodiment.

Although the pressing portion is configured to suppress the lift of the detecting member before the connector body and the mating housing are properly connected in the case of the above embodiment, the pressing portion may be configured to suppress the lift of the detecting member also after the proper connection of the connector body and the mating housing as another embodiment.

Although the ribs other than the first and second movement restricting portions are also point-symmetrically shaped with respect to the center of the back view of the cover in the case of the above embodiment, only the respective shape parts of the first and second movement restricting portions may be point-symmetrically shaped with respect to the center of the back view of the cover as another embodiment. In short, the parts other than the first and second movement restricting portions may not be point-symmetrically shaped.

Although the cover is provided with the first and second movement restricting portions and the first and second pressing portions in the case of the above embodiment, the housing may be provided with the first and second movement restricting portions and the first and second pressing portions as another embodiment.

Although the lever is supported on the housing in the case of the above embodiment, the lever may be supported on a wire cover as another embodiment.

LIST OF REFERENCE NUMERALS

10 . . . connector body
11 . . . lever
12 . . . detecting member
13 . . . terminal fitting
14 . . . mating housing
15 . . . housing
16 . . . cover
17 . . . front holder
18 . . . retainer
19 . . . receptacle
20 . . . male terminal fitting
21 . . . cam follower
22 . . . cavity
23 . . . locking lance
24 . . . wire
25 . . . retainer mounting hole
26 . . . male terminal insertion hole
27 . . . lever accommodation chamber
28 . . . upper wall portion
29 . . . cam follower insertion groove
30 . . . arm escaping portion
31 . . . lock arm
32 . . . shaft portion
33 . . . lock portion
34 . . . rail groove
35 . . . meshing portion
36 . . . lock receiving portion
37 . . . cut portion
38 . . . stopper portion
39 . . . back wall
40 . . . one facing wall
41 . . . other facing wall
42 . . . wire draw-in opening
43 . . . wire draw-out opening
44 . . . draw-out tube
45 . . . fastening means
46 . . . closing portion
47 . . . rail portion
48 . . . locking portion
49 . . . locking projection
50 . . . guide portion
51 . . . stopped portion
52 . . . first rib (rib)
53 . . . second rib (rib)
54 . . . first movement restricting portion (movement restricting portion)
55 . . . second movement restricting portion (movement restricting portion)
56 . . . first movement path (movement path)
57 . . . second movement path (movement path)
58 . . . recess
59 . . . partial lock receiving portion
60 . . . first pressing portion (pressing portion)
61 . . . second pressing portion (pressing portion)
62 . . . bearing portion
63 . . . cam groove
64 . . . partial locking piece
65 . . . slit portion
66 . . . bridge portion
67 . . . inclined portion
68 . . . lock projection
69 . . . deflection space
70 . . . first protection wall (protection wall)
71 . . . second protection wall (protection wall)
72 . . . contact stop portion
73 . . . mounting portion
74 . . . recessed portion
75 . . . wall surface portion
76 . . . opening portion
77 . . . ceiling wall
78 . . . lever pressing surface
79 . . . frame portion
80 . . . locked portion
81 . . . resilient locking portion
82 . . . base portion
83 . . . detecting member pressing surface
84 . . . detecting piece
85 . . . restricting surface
86 . . . rib-like portion
87 . . . engaging piece
88 . . . movement restricted portion
89 . . . projecting portion
90 . . . pressed portion
91 . . . coupling portion
92 . . . guide rib
A . . . center position of cover

What is claimed is:

1. A connector, comprising:

a connector body;

a lever supported on the connector body, the lever promoting connection of the connector body and a mating housing; and a detecting member supported in the lever, the detecting member being movable to a detection position when the connector body and the mating housing are properly connected, wherein:

the lever is rotatable along an outer surface of the connector body, the detecting member is movable to the detection position along the outer surface of the connector body, the connector body includes, on an outer surface side, a movement restricting portion arcuately extending in a rotating direction of the lever, the movement restricting portion being capable of abutting on a surface of the detecting member on a detection position side before the connector body and the mating housing are properly connected, the connector body includes, on the outer surface side, a pressing portion capable of abutting on a surface of the detecting member opposite to a surface of the detecting member facing the outer surface of the connector body, and the pressing portion is orthogonal to the movement restricting portion.

2. The connector of claim 1, wherein:

the connector body includes a rib on the outer surface of the connector body, and the movement restricting portion and the pressing portion are provided on a projecting end part of the rib.

3. The connector of claim 1, wherein:

the outer surfaces of the connector body are arranged in a pair, and the lever is in the form of a flat plate rotatable along either one of the pair of outer surfaces of the connector body.

4. The connector of claim 1, comprising a deflectable and deformable lock arm for holding the connector body and the mating housing in a connected state, wherein:

the connector body has a movement path to the detection position for the detecting member on the outer surface of the connector body, the movement path is facing an end part of the movement restricting portion in an extending direction, and the detecting member includes a detecting piece to be arranged in a deflection space for the lock arm at the detection position.

* * * * *